United States Patent [19]

Drelich et al.

[11] Patent Number: 5,098,764
[45] Date of Patent: Mar. 24, 1992

[54] NON-WOVEN FABRIC AND METHOD AND APPARATUS FOR MAKING THE SAME

[75] Inventors: Arthur Drelich, Plainfield; Alton H. Bassett, Princeton; John Kennette, Somerville; William James, East Windor; Linda J. McMeekin, Bound Brook, all of N.J.

[73] Assignee: Chicopee, New Brunswick, N.J.

[21] Appl. No.: 491,797

[22] Filed: Mar. 12, 1990

[51] Int. Cl.⁵ .................................................. B32B 3/10
[52] U.S. Cl. ..................................... 428/131; 28/104; 28/105; 428/255; 428/299
[58] Field of Search ................... 28/104, 105; 428/299, 428/131, 255

[56] References Cited

U.S. PATENT DOCUMENTS

| | | | |
|---|---|---|---|
| 1,978,620 | 10/1934 | Brewster | 154/2 |
| 2,862,251 | 12/1958 | Kalwaites | 19/161 |
| 3,025,585 | 3/1962 | Griswold | 28/1 |
| 3,033,721 | 5/1962 | Kalwaites | 154/46 |
| 3,081,500 | 3/1963 | Griswold et al. | 19/161 |
| 3,081,501 | 3/1963 | Kalwaites | 19/161 |
| 3,081,515 | 3/1963 | Griswold et al. | 28/72 |
| 3,104,998 | 9/1963 | Gelpke | 161/109 |
| 3,214,819 | 11/1965 | Guerin | 28/72.2 |
| 3,240,657 | 3/1966 | Hynek | 161/109 |
| 3,284,857 | 11/1966 | Hynek | 19/161 |
| 3,330,009 | 7/1967 | Hynek | 19/161 |
| 3,485,706 | 12/1969 | Evans | 161/72 |
| 3,486,168 | 12/1969 | Evans et al. | 161/169 |
| 3,498,874 | 3/1970 | Evans et al. | 161/109 |
| 3,679,535 | 7/1972 | Kalwaites | 161/109 |
| 3,681,182 | 8/1972 | Kalwaites | 161/109 |
| 3,681,183 | 8/1972 | Kalwaites | 161/109 |
| 3,681,184 | 8/1972 | Kalwaites | 161/109 |
| 3,750,236 | 8/1973 | Kalwaites | 19/161 P |
| 3,750,237 | 8/1973 | Kalwaites | 19/161 P |
| 3,787,932 | 1/1974 | Kalwaites | 19/161 P |
| 3,800,364 | 4/1974 | Kalwaites | 19/161 P |
| 3,873,255 | 3/1975 | Kalwaites | 425/83 |
| 4,379,799 | 4/1983 | Holmes et al. | 428/131 |
| 4,465,726 | 8/1984 | Holmes et al. | 428/131 |
| 4,960,630 | 9/1990 | Greenray et al. | 428/299 |
| 4,970,104 | 11/1990 | Raduamski | 428/299 |

FOREIGN PATENT DOCUMENTS 881075-49.3 11/1988 Fed. Rep. of Germany.
2200927A 8/1988 United Kingdom.

*Primary Examiner*—James J. Bell
*Attorney, Agent, or Firm*—Robert L. Minier

[57] ABSTRACT

Non-woven fabrics comprising yarn-like fiber groups of parallel and tightly compacted fiber segments, which groups include fiber segments circumferentially wrapped around at least a portion of the fiber groups. The groups are interconnected at junctures by fibers common to the plurality of such groups.

26 Claims, 18 Drawing Sheets

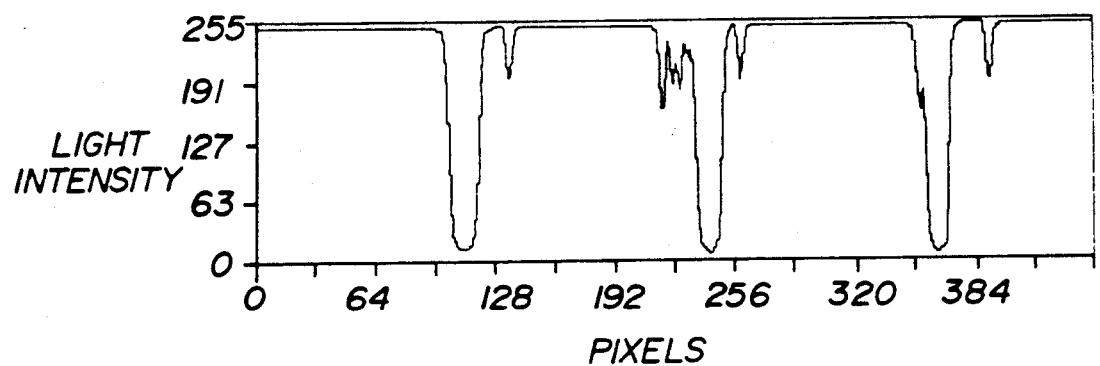
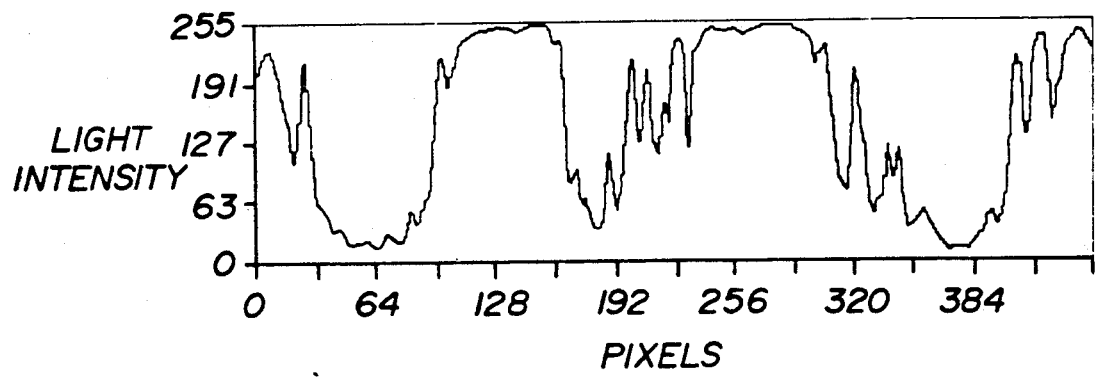

NON-WOVEN FABRIC AND METHOD AND APPARATUS FOR MAKING THE SAME

BACKGROUND OF THE INVENTION

For many years, attempts have been made to produce a fabric having the strength and other characteristics of woven or knitted fabrics without having to go through the innumerable steps required to produce such fabrics. To produce woven or knitted fabrics, a yarn must first be produced. Yarns are normally produced by opening and carding fibers and producing a web of fibers. The fiber web is condensed into a sliver from which a roving is produced by doubling and drawing the slivers. A number of rovings are further doubled and drawn to produce a yarn. To produce the final fabric, the yarns are woven by a loom into a woven fabric or are knitted on a complicated knitting machine. Often the yarn has to be sized with starch or other materials before it can be processed on the weaving or knitting machines.

During the past twenty to thirty years, various processes have been developed and attempts have been made to produce a fabric directly from a web of fibers eliminating most if not all of the various steps described above. Some of these methods involved the use of pins or needles disposed in a pattern. The needles are inserted through a fiber web to produce openings in the web and simulate the appearance of a woven fabric. The resultant product is weak and requires the addition of a chemical binder to produce desired strength. The addition of binder substantially modifies the hand, flexibility, drape and other desirable physical properties and makes it virtually impossible to duplicate the desired properties of woven or knitted fabrics. Other techniques have involved the use of fluid or liquid forces, which are directed at the fiber web in a predetermined Pattern to manipulate the fibers in a manner that the product produced has some of the characteristics of woven or knitted fabrics. In some of these prior techniques the fiber web is supported on a member having a predetermined topography while being treated with fluid forces to alter the fiber configuration and produce a nonwoven fabric. Examples of methods for producing nonwoven fabrics are disclosed and described in U.S. Pat. Nos. 1,978,620; 2,862,251; 3,033,721; 3,081,515; 3,485,706; and 3,498,874.

While fabrics, produced by some of the methods previously described, have been successful commercially, the resulting fabrics still have not had all of the desired characteristics of many woven and/or knitted fabrics. All of these techniques have lacked the ability to obtain either the desired combinations of physical properties in the final fabric or the desired appearance of a woven or knitted fabric or both. The prior art methods have lacked precise control of fiber placement and control of the forces impinging on the fibrous web.

Generally, a fabric should be of uniform construction and have good strength. The fabric should have good clarity or openness, even if the fabric is of a relatively high weight. The fabric should be low linting yet absorbent. The desired combination of properties should be obtainable without the addition of chemical binders. The process should be controllable so as to allow the production of fabrics having desired combinations of physical properties.

SUMMARY OF THE PRESENT INVENTION

It is an object of the present invention to produce a non-woven fabric having excellent strength in the absence of additive binder materials.

It is a further object of the present invention to produce a fabric that is uniform in appearance and has uniform and controlled physical properties. It is yet another object of the present invention to produce fabrics that have excellent clarity of pattern and open areas.

In certain embodiments of the present invention, our new non-woven fabric comprises a multiplicity of yarn-like fiber groups wherein the groups are virtually as dense and fine as spun yarns. These groups are interconnected at junctures by fibers that are common to a plurality of the groups. The groups define a pre-determined pattern of openings in the final fabric. Each group comprises a Plurality of parallel and tightly compacted fiber segments. At least some of the groups include entangled areas of fiber segments circumferentially wrapped around a portion of the periphery of the parallel and tightly compacted fiber segments and also through the fiber group. In these embodiments of the fabrics of the present invention, there are entangled areas that have a fiber bundle projecting in opposite directions from the entangled area.

In some embodiments of the new non-woven fabrics of the present invention, the parallel and tightly compacted fiber segments have twist. The twist extends either from one interconnected area to an adjacent interconnected area or there are opposed twists with one twist extending from an inter-connected area to a wrapped-around entangled portion and an opposite twist extending from that wrapped-around entangled portion to the adjacent interconnected area.

In many embodiments of the present invention, the interconnected junctures are dense, highly entangled areas which comprise a plurality of fiber segments. Some of the fiber segments in the area are straight while others have a 90° bend in the segment. Still other fiber segments in the junctures follow a diagonal path as the segment passes through the juncture. Some fiber segments extend in the 'Z' direction within the entangled areas. The 'Z' direction is the thickness of the fabric as contrasted to the length or width of the fabric.

In certain embodiments, the wrapped around entangled portions may be in the center between two junctures while in other embodiments the wrapped-around entangled portions may be off-center. In still other embodiments, there may be a multiplicity of wrapped-around entangled portions between adjacent interconnected junctures.

Clarity or openness of the fabrics of the present invention is exceptional, also the density of the compacted fiber groups and the interconnected junctures is higher than that of prior art non-woven fabrics. In certain instances the density of the groups and/or junctures may approach the density of the yarns in woven or knitted fabrics. Furthermore, in many fabrics of the present invention, the density in the fiber groups and the interconnected junctures is extremely uniform as compared to prior art non-woven fabrics. The novel methods of the present invention emplace and entangle fibers more accurately and predicably then heretofore, thereby enabling fabrics with superior properties to be produced.

The fabrics of the present invention are produced by directing controlled fluid forces against one surface of a layer of fibers while the layer is supported on its opposite surface by a member having a pre-determined topography as well as a pre-determined pattern of open areas within that topography. In one specific method for manufacturing our new non-woven fabrics, the backing member for supporting the fiber web is three-dimensional and includes a plurality of pyramids disposed in a pattern over one surface of the backing member. The sides of the pyramids are at an angle of greater than 55° to the horizontal surface of the backing member. It is preferred that the angle be 65° or greater and an angle of 75° produces excellent fabrics according to the present invention. The backing member also includes a plurality of openings therein with the openings being disposed in the areas where the sides of the pyramids meet the backing member. Means are also included for projecting adjacent fluid streams simultaneously against the top and/or sides of the pyramids while the fiber layer is supported by the pyramids.

BRIEF DESCRIPTION OF THE DRAWINGS

FIG. 39 is a histogram of grey level intensity of woven guaze;

FIG. 40 is a histogram of grey level intensity of a non woven fabric of the Prior art.

DETAILED DESCRIPTION OF THE DRAWINGS

Figure 1:
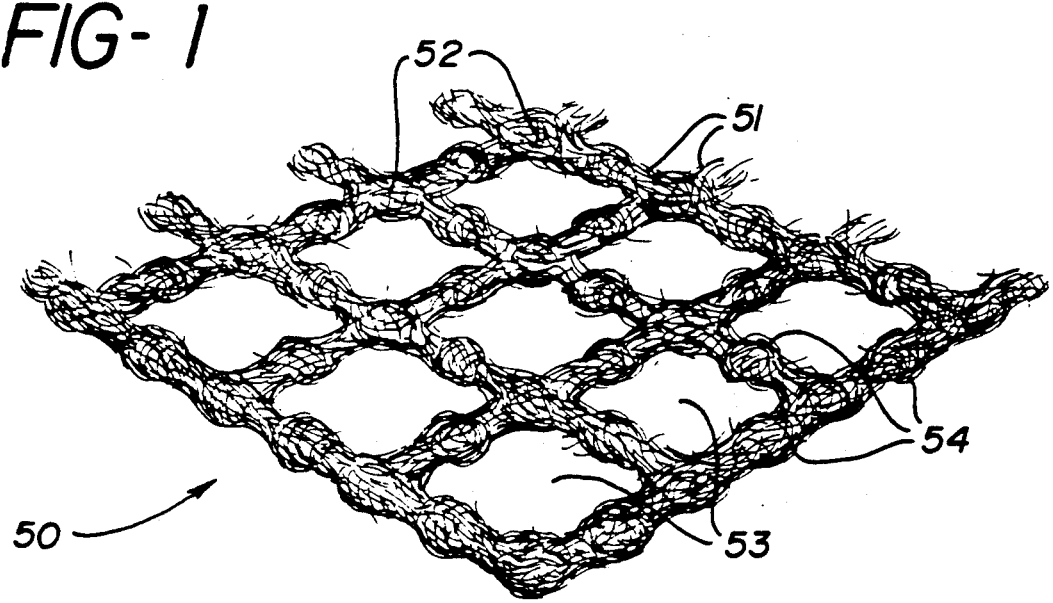
FIG. 1 is a schematic perspective view of a fabric of the present invention.

Referring to the drawings, FIG. 1 is a perspective view of a fabric 50 of the present invention. As may be seen in this Figure, the fabric comprises a multiplicity of Yarn-like fiber bundles 51, which extend between and are interconnected at junctures 52. These fiber bundles and junctures define a pattern of openings 53 with the openings having a generally square configuration. Each of the fiber bundles comprises fiber segments which have been densified and compacted. In these fiber bundles many of the fiber segments are Parallel to each other. As may be seen in the drawing, substantially at the center of the fiber bundle between adjacent junctures, there is a further entangled area 54 wherein the fibers tend to be circumferentially wrapped about the periphery of the parallel compacted fiber segments. As may be seen, the fiber bundle projects, from the opposite sides of the circumferentially entangled area. This configuration is hereinafter referred to as a "bow tie" or "bow tie area."

Figure 2:
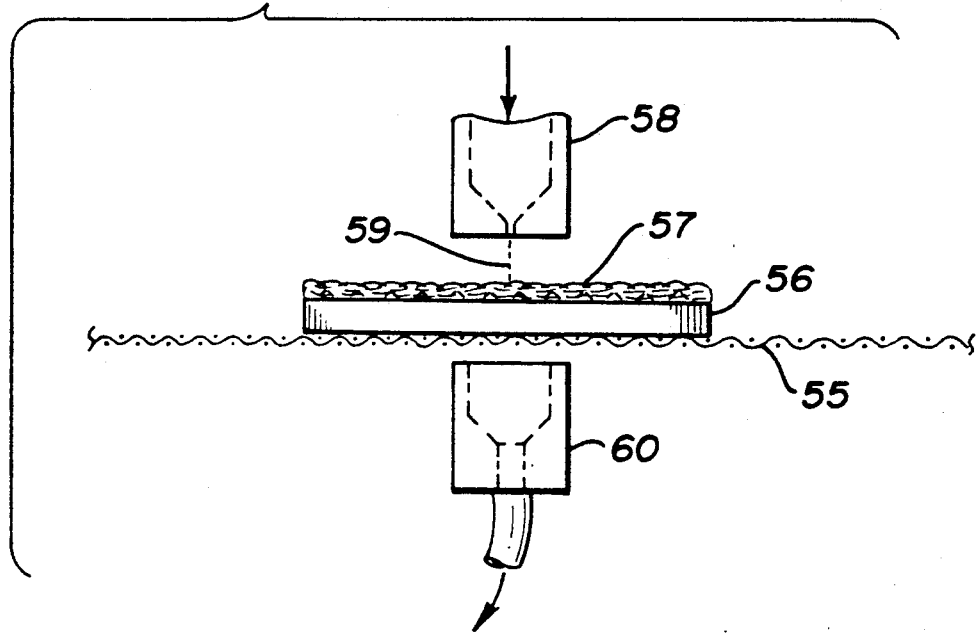
FIG. 2 is a schematic sectional view of apparatus for producing fabrics according to the present invention.

FIG. 2 is a schematic cross sectional view of apparatus for producing fabrics of the present invention. In this apparatus, there is a movable conveyor belt 55, and placed on top of this belt, to move with the belt, is a novel configured topographical support member 56. The support member has a plurality of pyramids as well as a plurality of openings disposed in said topographical member, which will be more fully described hereinafter. Placed on top of this topographical support member is a web of fibers 57. This may be a nonwoven web of carded fibers, air-laid fibers, melt-blown fibers or the like. Above the fibrous web is a manifold 58 for applying a fluid 59, preferably water, to the fibrous web as the fibrous web, supported on the topographical member, is moved on the conveyor belt beneath the manifold. The water may be applied at varying pressures. Disposed beneath the conveyor belt is a vacuum manifold 60 for removing water from the area as the web and typographical support member are passed under the fluid manifold. In operation, the fibrous web is placed on the topographical support member and the fibrous web and topographical member passed under the fluid manifold. Water is applied to the fibrous web to wet-out the fibrous web, and insure that the web is not removed or disrupted from its position on the topographical member on further treatment. Thereafter, the topographical support member and the web are passed beneath the manifold a series of times. During these passes, the pressure of the water in the manifold is increased from a starting pressure of about 100 psi to pressures of 1000 psi or more. The manifold itself consists of a plurality of holes of from 4 to 100 or more per inch. Preferably, the number of holes in the manifold is from 30 per inch to 70 per inch. The holes are approximately seven thousands of an inch in diameter. After the web and topographical support member are passed under the manifold a series of times, the water is stopped and the vacuum continued, to assist in de-watering the web. The web is then removed from the topographical member and dried to produce a fabric as described in conjunction with FIG. 1.

Figure 3:
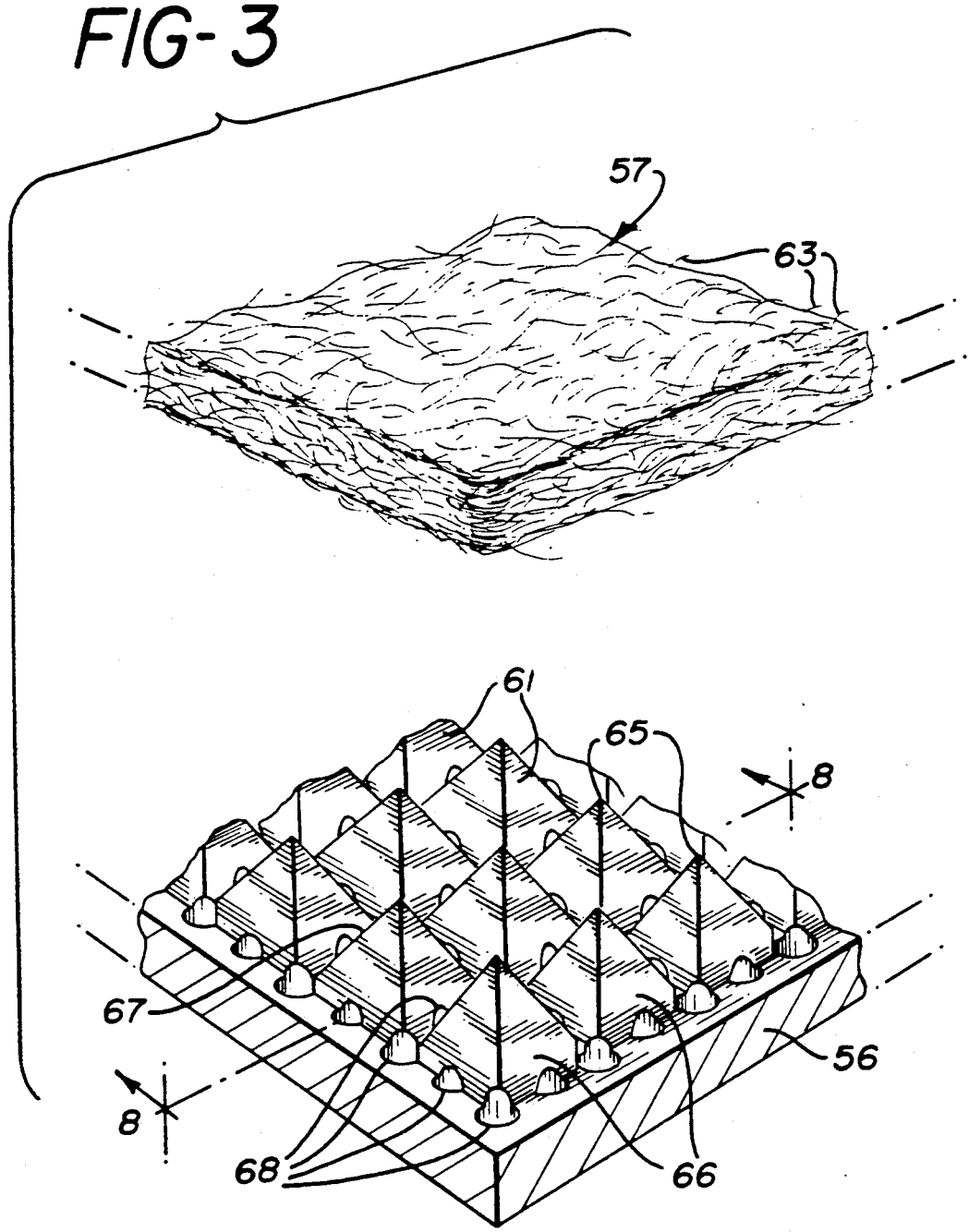
FIG. 3 is an exploded perspective view of a fibrous web and a topographical support member.

FIG. 3 is an exploded perspective view of a portion of the fibrous web and support member described in FIG. 2. The web 57 comprises substantially random layered fibers 63. The fibers may vary in length from a quarter of an inch or less to an inch and a half or more. It is Preferred that when using the shorter fibers (including wood pulp fiber) that the short fibers be blended with longer fibers. The fibers may be any of the well known artificial, natural or synthetic fibers, such as cotton, rayon, nylon, polyester, or the like. The web may be formed by any of the various techniques well known in the art, such as carding, air laying, wet laying, melt-blowing and the like.

The critical portion of the apparatus of the present invention is the topographical support member. One embodiment of the support member upon which the web is reformed into the unique fabrics of the present invention is shown in FIG. 3. As shown, the member 56 comprises rows of pyramids 61. The apices 65 of the pyramids are aligned in two directions perpendicular to each other. The sloping surfaces of the pyramids are hereinafter referred to as "sides" 66 and the spaces between the pyramids are hereinafter referred to as "valleys" 67.

A plurality of holes 68 extending through the support member are disposed in a pattern in the support member. In this embodiment there is a hole disposed in each valley at the center of the sides of adjacent pyramids and at each corner where four pyramids meet. The holes at the sides of the pyramids extend at least partially up the sides of the adjacent pyramids. The criticality in the topographical support member of the present invention resides in the angle the side of the pyramid makes with the horizontal plane of the support member, the placement and shape of the holes, and the size and the shape of the valleys. When a fibrous web is placed on top of such a topographical member and fluid entangled as described in conjunction with FIG. 2, a fabric is produced that unexpectedly has extreme clarity and regularity of fabric structure. Furthermore, when the topographical support member as described in conjunction with FIG. 3 is used, the fabric produced includes "bow ties" as previously described. The angle that the sides of the pyramids make with the horizontal plane must be at least 55° and preferably 65° or more. We have found that if the angle is 65° to 75° it is especially suitable for producing fabrics in accordance with the present invention. To form the "bow ties," or the circumferentially wrapped entangled fiber areas, the holes in the topographical support member are positioned at the sides of the pyramids. Holes also may be placed in other positions, such as at the corners of the pyramids. Holes at the corners tend to improve the entangling at the junctures and the clarity of the final fabric. This is especially true with the heavier weight fabrics. The width of the valleys at their base will control the width or the size of the yarn-like fiber bundles between the interconnected junctures.

In producing the fabric as described in accordance with FIG. 2, when the fluid impinges on the fiber web, it drives the fibers down to the valley floor and compresses the fibers into the available space. It is theorized that the fluid also produces an "eddy," or a circular motion as it is driving the fibers down to the valley floor. The combination of the opening at the side of the pyramid and the fluid forces cause fiber segments to be circumferentially wrapped about other fiber segments. During the process substantially all of the fibers are driven down the sides of the pyramids so that the area of the fabric corresponding to the base of the pyramid is virtually devoid of fibers.

Figure 4:
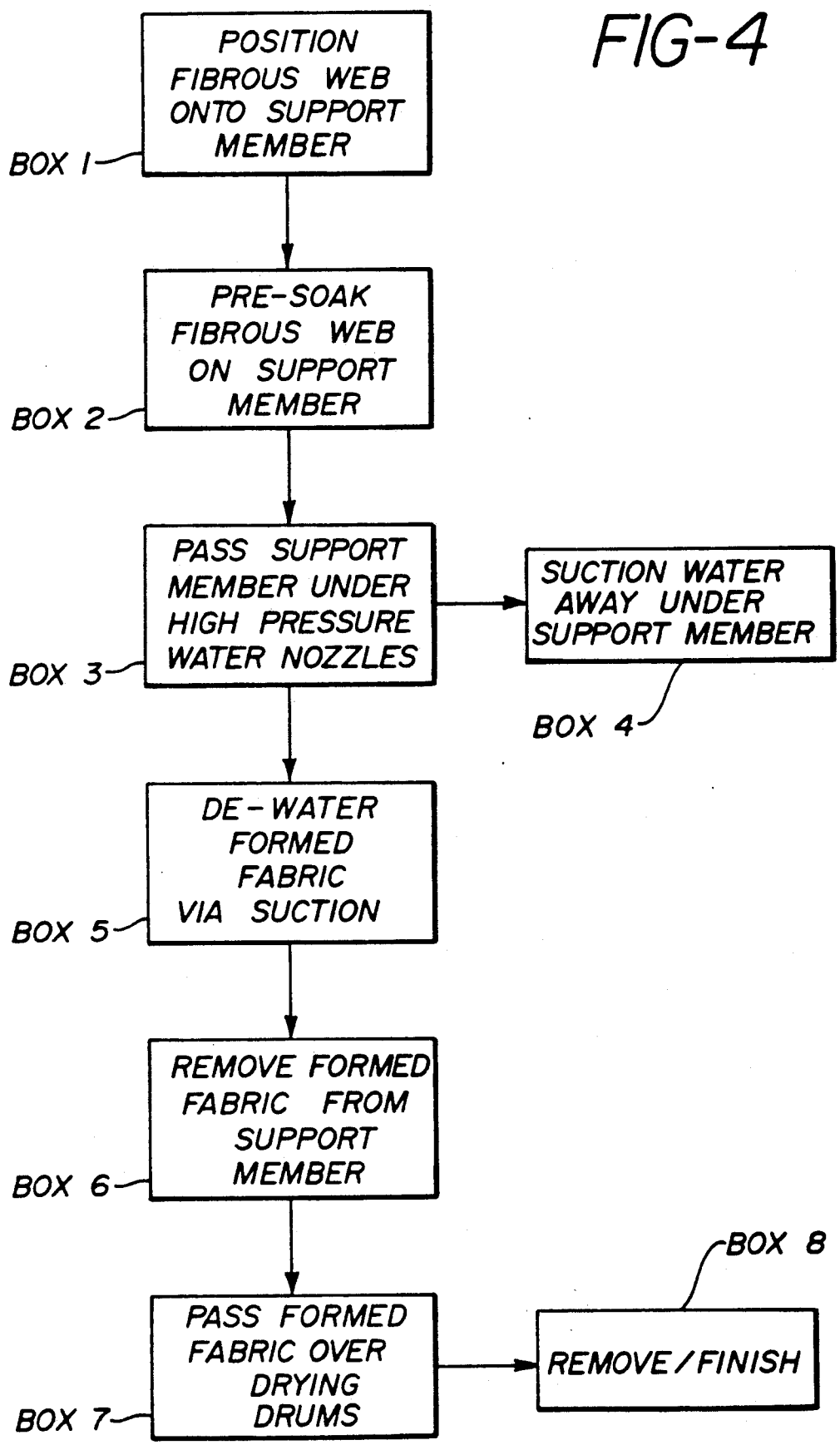
FIG. 4 is a block diagram showing the various steps of the process for producing fabrics according to the present invention.
Figure 5:
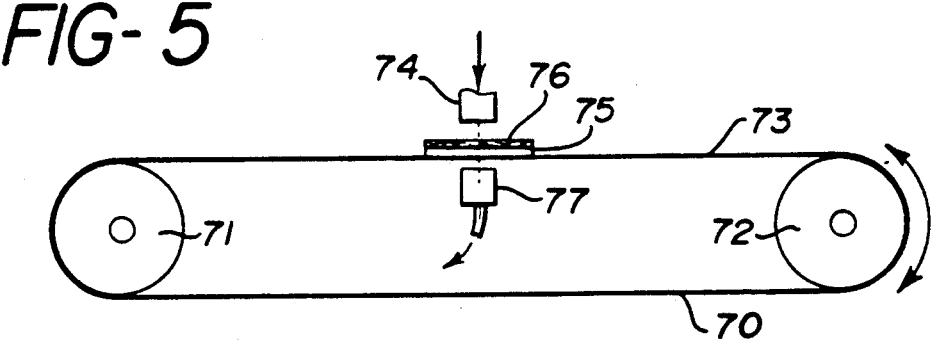
FIG. 5 is a diagrammatic view of one type of apparatus for producing fabrics according to the present invention.

FIG. 4 is a block diagram showing the various steps in the process of producing the novel fabrics of the present invention. The first step in this process is to position a web of fibers on a topographical support member (Box 1). The fibrous web is pre-soaked or wetted out while on this support member (Box 2) to ensure that as it is being treated it will remain on the support member. The support member with the fibrous web thereon is passed under high pressure fluid ejecting nozzles (Box 3). The preferred fluid is water. The water is transported away from the support member, preferably using a vacuum (Box 4). The fibrous web is de-watered (Box 5). The de-watered formed fabric is removed from the support member (Box 6). The formed fabric is passed over a series of drying drums to dry the fabric (Box 7). The fabric may then be finished or otherwise processed as desired (Box 8). FIG. 5 is a schematic representation of one type of apparatus for carrying out the process and producing the fabrics of the present invention. In this apparatus a foraminous conveyor belt 70 moves continuously about two spaced apart rotating rolls 71 and 72. The belt is driven so that it can be reciprocated or moved in either a clockwise or counterclockwise direction. At one position on the belt, in the upper reach 73 of the belt, there is placed above the belt a suitable water ejecting manifold 74. This manifold has a plurality of very fine diameter holes, of about 7/1000 of an inch in diameter, with about 30 holes per inch. Water under pressure is driven through these holes. On top of the belt is placed a topographical support member 75 and on top of that topographical member the fiber web 76 to be formed is placed. Directly beneath the water manifold, but under the upper reach of the belt, is a suction manifold 77 to aid in removing the water and prevent undue flooding of the fiber web. Water from the manifold impinges on the fiber web, passes through the topographical support member and is removed by the suction manifold. As may be appreciated, the topographical support member with the fibrous web thereon may be passed under the manifold a number of times as desired to produce fabrics in accordance with the present invention.

Figure 6:
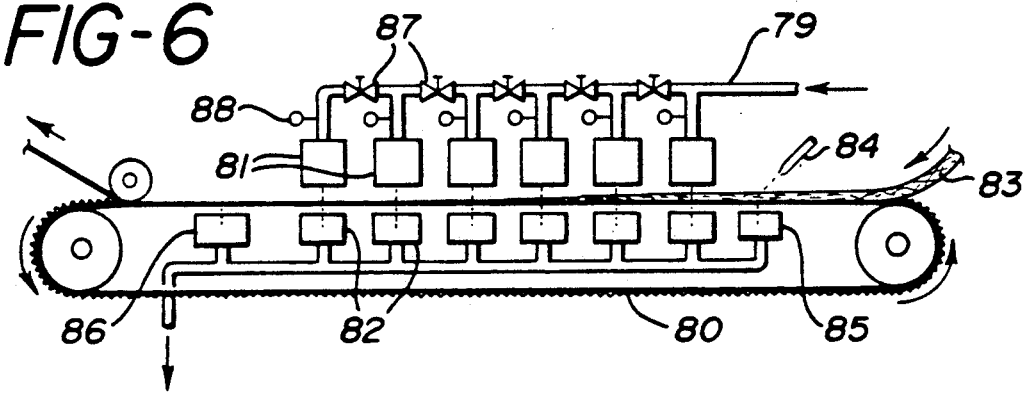
FIG. 6 is a diagrammatic view of another type of apparatus for producing fabrics according to the present invention.

In FIG. 6 there is depicted an apparatus for continuously producing fabrics in accordance with the Present invention. This schematic representation of the apparatus includes a conveyor belt 80 which actually serves as the topographical support member in accordance with the present invention. The belt is continuously moved in a counterclockwise direction about spaced apart members as is well known. Disposed above this belt is a fluid feeding manifold 79 connecting a plurality of lines or groups 81 of orifices. Each group has one or more rows of very fine diameter holes with 30 or more holes per inch. The manifold is equipped with pressure gauges 87 and control valves 88 for regulating the fluid pressure in each line or group of orifices. Disposed beneath each orifice line or group is a suction member 82 for removing excess water, and to keep the area from undue flooding. The fiber web 83 to be formed into the fabric of the present invention is fed to the topographical support member conveyor belt. Water is sprayed through an appropriate nozzle 84 onto the fibrous web to pre-soak or pre-water the web and aid in controlling the fibers as they pass under the pressure manifolds. A suction slot 85 is placed beneath this water nozzle to remove excess water. The fibrous web passes under the fluid feeding manifold with the manifold preferably having an increased pressure. For example, the first lines of holes or orifices may supply fluid forces at 100 psi, while the next lines of orifices may supply fluid forces at a pressure of 300 psi, and the last lines of orifices supply fluid forces at a pressure of 700 psi. Though six fluid supplying lines of orifices are shown, the number of lines or rows of orifices is not critical, but will depend on the weight of the web, the speed, the pressures used, the number of rows of holes in each line, etc. After passing between the fluid feeding and suction manifolds the formed fabric is passed over an additional suction slot 86 to remove excess water from the web. The typographical support member may be made from relatively rigid material and may comprise a plurality of slats. Each slat extends across the width of the conveyor and has a lip on one side and a shoulder on the opposite side so that a shoulder of one slat engages with the lip of an adjacent slat to allow for movement between adjacent slats and allow for these relatively rigid member to be used in the conveyor configuration shown in FIG. 6.

Figure 7:
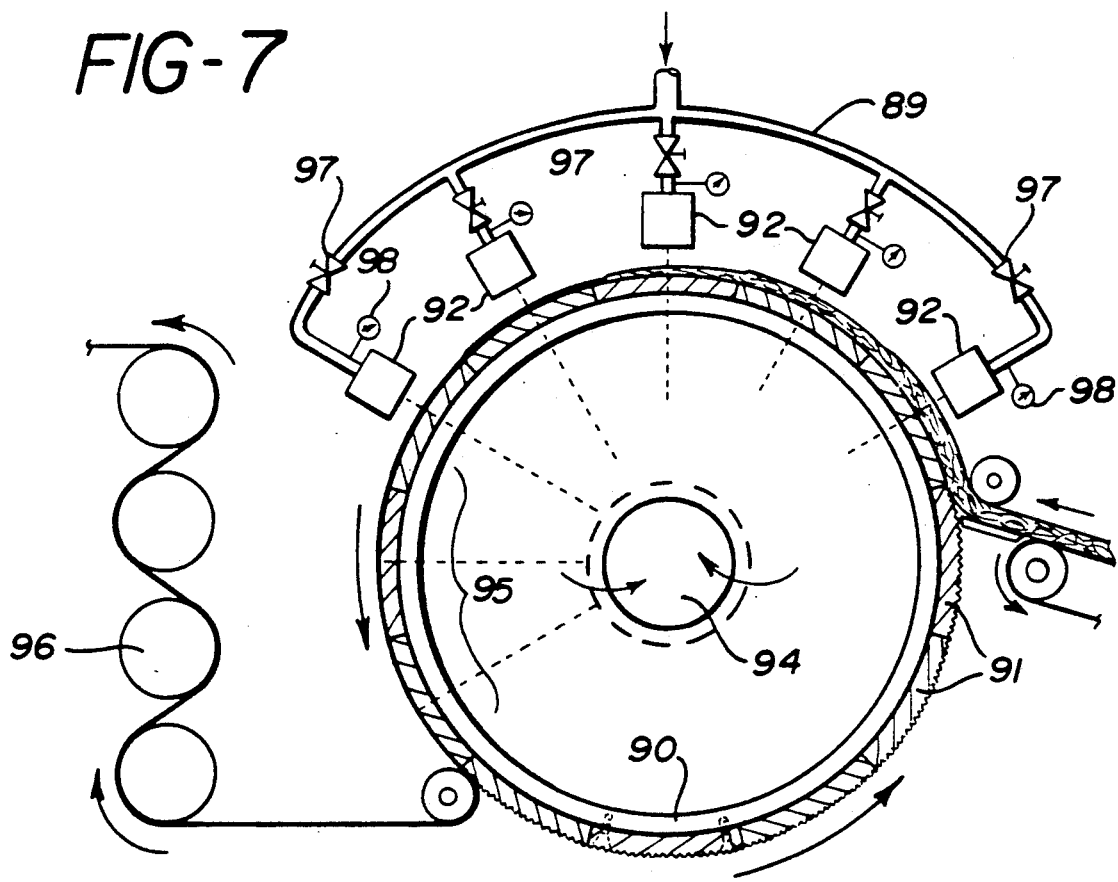
FIG. 7 is a diagrammatic view of a preferred type of apparatus for producing fabrics according to the present invention.

A preferred apparatus for producing fabrics in accordance with the present invention, is schematically depicted in FIG. 7. In this apparatus, the topographical support member is a rotatable drum 90. The drum rotates in a counterclockwise direction and includes a plurality of curved plates 91, having the desired topographical configuration, disposed so as to form the outer surface of the drum. Disposed about a portion of the periphery of the drum is a manifold 89 connecting a plurality of orifice strips 92 for applying water or other fluid to a fibrous web 93 placed on the outside surface of the curved plates. Each orifice strip may comprise one or more rows of very fine diameter holes of approximately 5/1000 of an inch to 10/1000 of an inch in diameter. There may be as many as 50 or 60 holes per inch or more if desired. Water or other fluid is directed through the rows of orifices. The pressure in each orifice group is increased from the first group under which the fibrous web passes to the last group. The pressure is controlled by appropriate control valves 97 and pressure gauges 98. The drum is connected to a sump 94 on which a vacuum may be pulled to aid in removing water and to keep the area from flooding. In operation the fibrous web 93 is placed on the topographical support members 91 before the water ejecting manifold 89. The fibrous web passes underneath the orifice strips and is formed into a fabric in accordance with the present invention. The formed fabric is then passed over a section of the topographical support member and drum 95 where there are no orifice strips, but vacuum is continued to be applied. The fabric after being de-watered is removed from the drum and passed around a series of dry cans 96 to dry the fabric.

FIGS. 8 through 19 are cross-sectional and planar views of various topographical support members that may be used in accordance with the present invention. In these FIGS., various pyramid configurations and patterns of openings that may be used in the topographical member are depicted.

Figure 8:
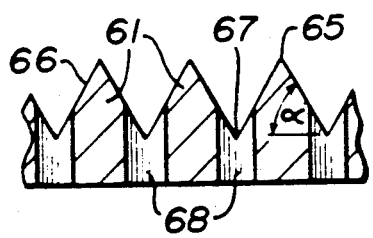
FIG. 8 is an enlarged cross-sectional view of a topographical support member.
Figure 9:
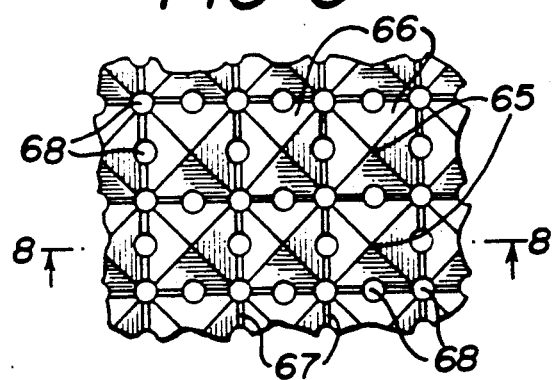
FIG. 9 is a plan view of the topographical support member depicted in FIG. 8.

FIG. 8 is a cross sectional view of the topographical support member depicted in FIG. 3 and FIG. 9 is a planar view of the member. The support member depicted in FIGS. 8 and 9 produces a fabric as described in conjunction with FIG. 1. As shown in FIG. 9, the pyramids 61 are square at their bottom. The pyramids are uniform in nature with each side 66 of the pyramid being an isosceles triangle. Each of the pyramids come to a Point or apex 65 and the apices are aligned in two directions perpendicular to each other. The bottom of the pyramids substantially abut each other so that there is a valley 67 of negligible width between the sides of the pyramids. The angle "a" that the side of the pyramid makes with the horizontal is approximately 70°. The topographical support member also includes openings 68 disposed at both the sides of the pyramids and the corners of the pyramids as shown. The openings at the pyramid sides extend up the sides of the pyramids as is shown in FIG. 8.

Figure 10:
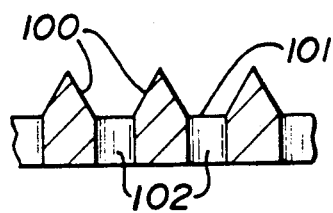
FIG. 10 is an enlarged cross-sectional view of a topographical support member.
Figure 11:
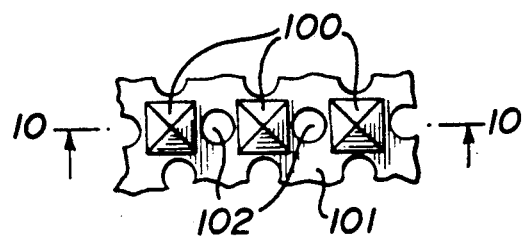
FIG. 11 is a plan view of the topographical support member depicted in FIG. 10.

FIGS. 10 and 11 depict another topographical support member that may be used in accordance with the present invention. FIG. 10 is a cross sectional view and Figure 11 is a planar view. The pyramids 100 are of substantially the same configuration and alignment as those depicted in FIGS. 8 and 9. However, the spacing between the sides of the pyramids to form valley 101 is substantially greater so that the openings 102 in the topographical support member do not extend up the sides of the pyramids. The configuration depicted in FIGS. 10 and 11 can be used with heavier weight fibrous webs as there is more room for the fibers to be compacted between the sides of the pyramids.

Figure 12:
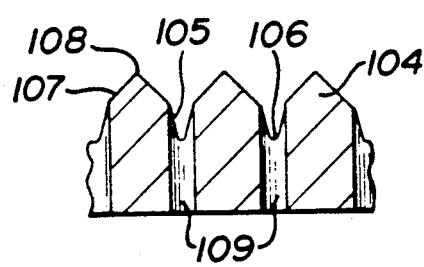
FIG. 12 is an enlarged cross-sectional view of a topographical support member.
Figure 13:
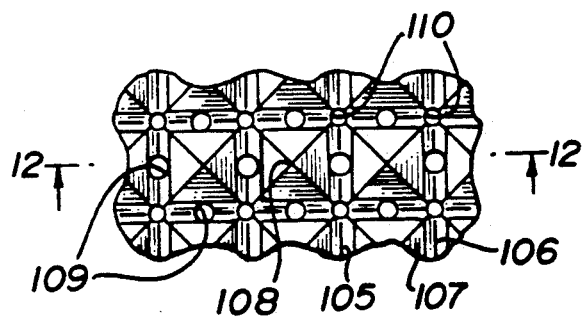
FIG. 13 is a plan view of the topographical support member depicted in FIG. 12.

FIGS. 12 and 13 show yet another embodiment of a topographical support member of the present invention. In this embodiment, the sides of the pyramids 104 have a compound angle. The portion 105 of the pyramid side which extends up from the valley 106 is at an angle of approximately 80° with the horizontal. The portion 107 of the pyramid side extending down from the pyramid apex 108 is at an angle of approximately 55° with the horizontal. The advantage to this configuration of pyramids is that the formed fabric may be more easily removed from the topographical support member. In this embodiment openings 109 are disposed at the sides of the pyramids and openings 110 are disposed at the corners where four pyramids meet. In this embodiment the openings at the sides of the pyramids are slightly larger than the openings at the corners.

Figure 14:
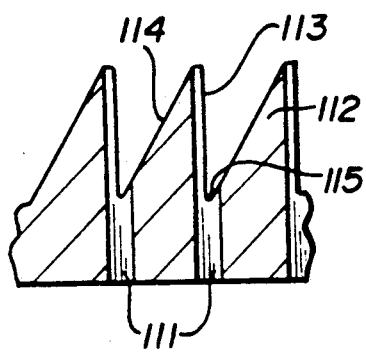
FIG. 14 is an enlarged cross-sectional view of a topographical support member.
Figure 15:
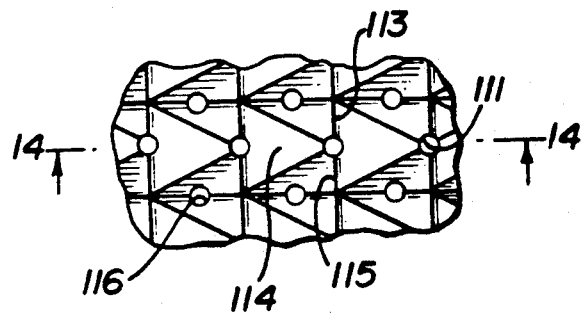
FIG. 15 is a plan view of the topographical support member depicted in FIG. 14.

FIGS. 14 and 15, show yet another embodiment of a topographical support member in accordance with the present invention. In this embodiment the sides of the pyramid are not uniform. The trailing edge 113 of each pyramid is substantially vertical while the leading edge 114 of each pyramid makes an angle of approximately 70° with the horizontal. The support member includes openings 116 as shown. By modifying the shape of the pyramids in this manner, the fluid forces working on the fibers can be controlled so that there is greater swirling action being accomplished in the valleys 115 between pyramids.

Figure 16:
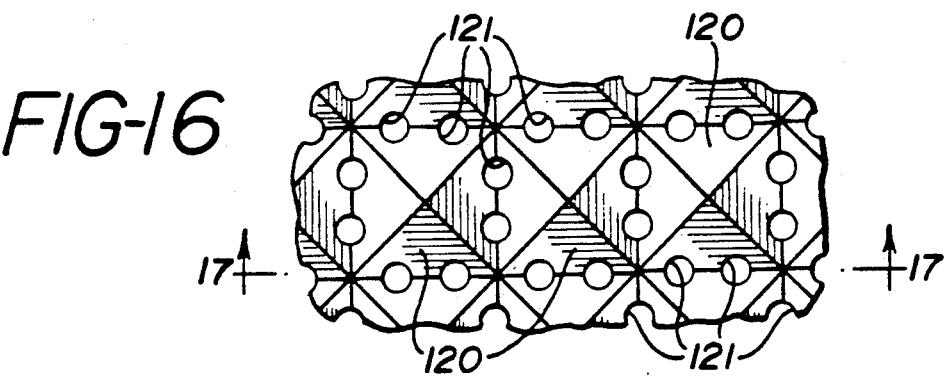
FIG. 16 is a partial plan view of a topographical support member.
Figure 17:
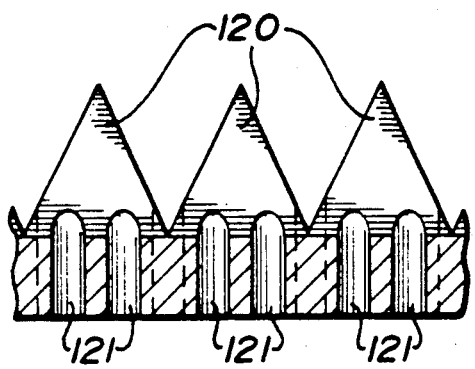
FIG. 17 is a cross-sectional view taken along line 17—17 of FIG. 16.

FIG. 16 is a planar view of a topographical support member in accordance with the present invention, and FIG. 17 is a cross sectional view taken along line 17—17 of FIG. 16. In this embodiment the pyramids 120 are equal sided with each side making an angle with the horizontal of about 70°. There are two openings 121 at each side of each pyramid. By positioning two openings at each side of the pyramid, a plurality of "bow ties" may be formed between adjacent interconnected junctures in the final fabric.

Figure 18:
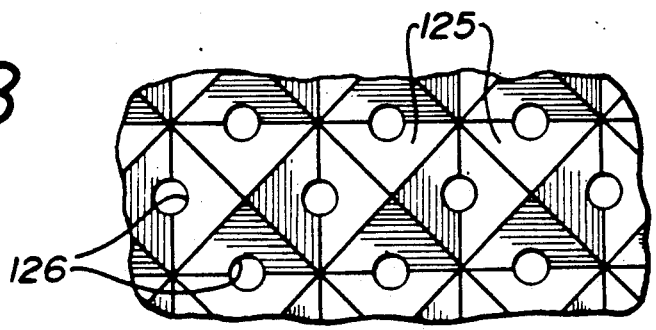
FIG. 18 is a partial plan view of a topographical support member.
Figure 19:
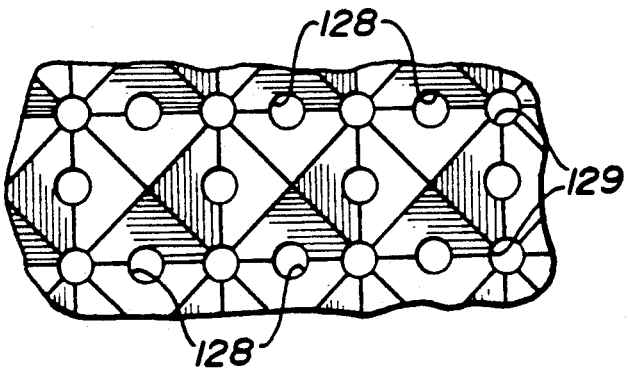
FIG. 19 is a partial plan view of another topographical support member.

FIGS. 18 and 19 are planar views of preferred embodiments of topographical members of the present invention. In both Figures the pyramids are four sided and uniform in configuration. In FIG. 18 there is an opening 126 positioned or disposed adjacent each side of the pyramids. In FIG. 19 there are openings 128 at the sides of the pyramids. There are also openings 129 at the corners where four pyramids meet. The openings at the sides of the pyramids are slightly larger in diameter than the openings at the corners of the pyramids.

Topographical support members of the present invention may be made from various materials, such as plastics, metals, and the like. The materials used should not substantially deform under the impact of the fluid impinging on the surface. The surface of the support member should not contain burrs or other imperfections but should be a relatively smooth surface. It is preferred that the support member not be highly polished as it is believed that a surface having some frictional characteristics is desirable in producing the fabrics of the present invention. Machine finished surfaces have been found to be especially suitable for producing the fabrics of the present invention.

In all instances, the topographical support member has a plurality of openings disposed in a pre-determined pattern as well as a plurality of pyramids either four-sided or three-sided as desired, with the pyramids making an angle with the horizontal of at least 55° and preferably between 60° and 75°. It is preferred that the openings in the plate extend up the sides of the pyramids, though this is not absolutely necessary, but it is believed that by doing so it is easier to obtain the desired compaction amongst the fibers being entangled.

It should be pointed out that not all of the holes or openings in the support member need extend completely through the support member. At least some of the holes may extend only partially through the support member provided they have a sufficient depth to reduce or prevent the undesirable flowing back of the fluid. If too much fluid or fluid with too great a force flows back into the fiber rearranging area, it may disrupt the desired fiber rearrangement.

Figure 20:
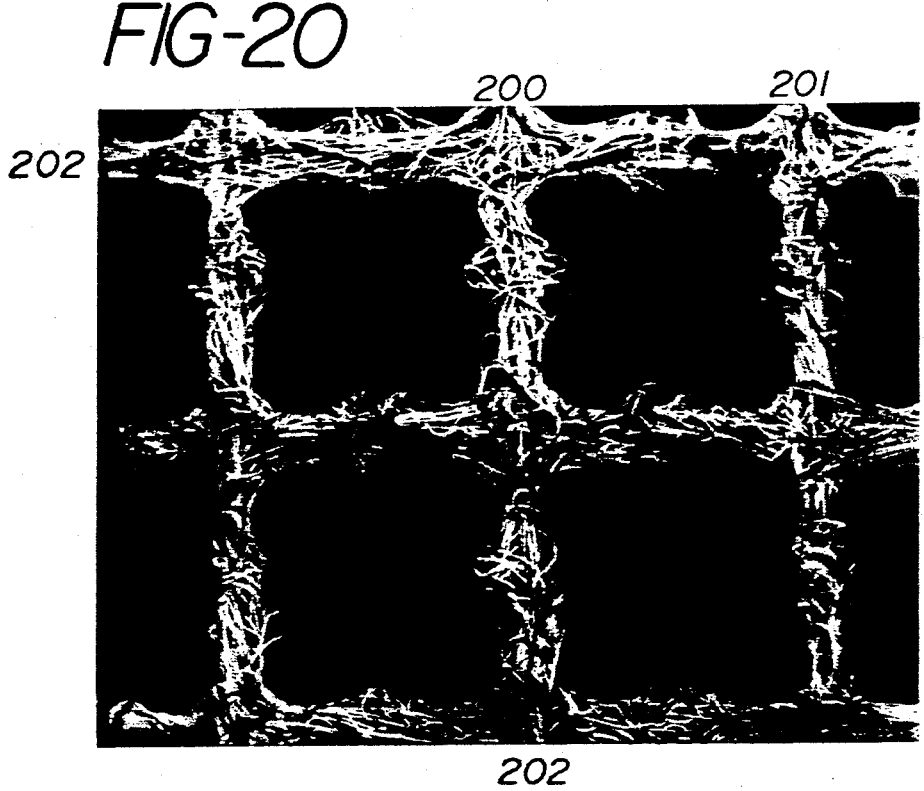
FIG. 20 is a photomicrograph of the fabric illustrated schematically in FIG. 1 enlarged about 20 times.

FIGS. 20 through 23 are photomicrographs of a fabric of the present invention. The fabric is a 600 grain weight fabric made of rayon fibers, the fibers being 1.5 denier and having a staple length of 1¼ inch. The fabric was formed on a plate similar to that depicted in FIG. 3 with the holes at the sides of the pyramids slightly larger in diameter than the holes at the corners of the pyramids. The plate had four-sided pyramids with the sides making an angle to the horizontal of approximately 75°. FIG. 20 is a plan view photomicrograph of the fabric taken at a magnification of 20 times. As may be seen, the fiber portions of the fabric are very dense and compacted while the open area is relatively free of fiber ends and is well defined and clear. The fabric comprises a multiplicity of yarn-like fiber groups 200. These groups are interconnected at junctures 201 by fibers common to a plurality of the groups and define a regular square pattern of openings. Between interconnected junctures are "bow-tie" areas 202.

Figure 21:
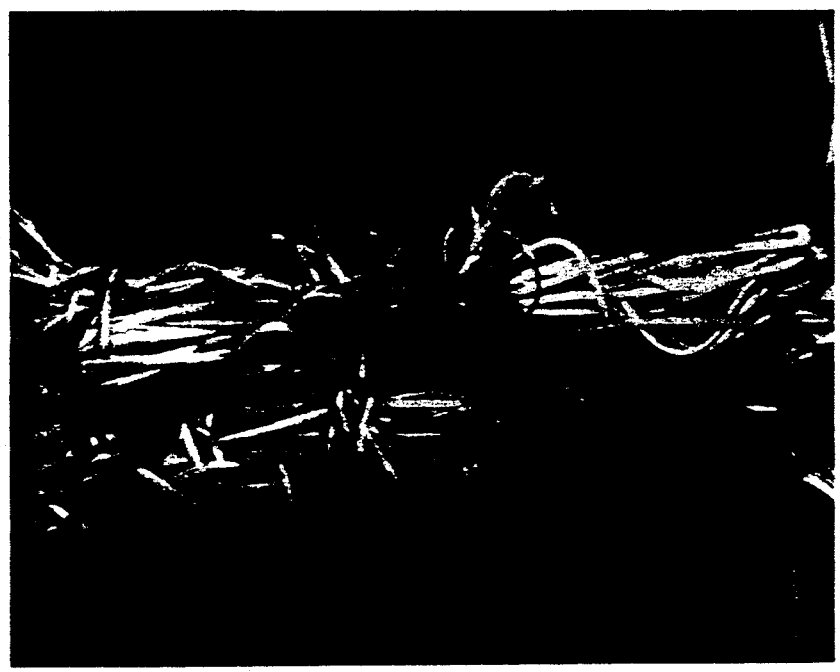
FIG. 21 is a photomicrograph of one of the "bow tie" areas of the fabric in FIG. 20 but further enlarged about 4 times.
Figure 22:
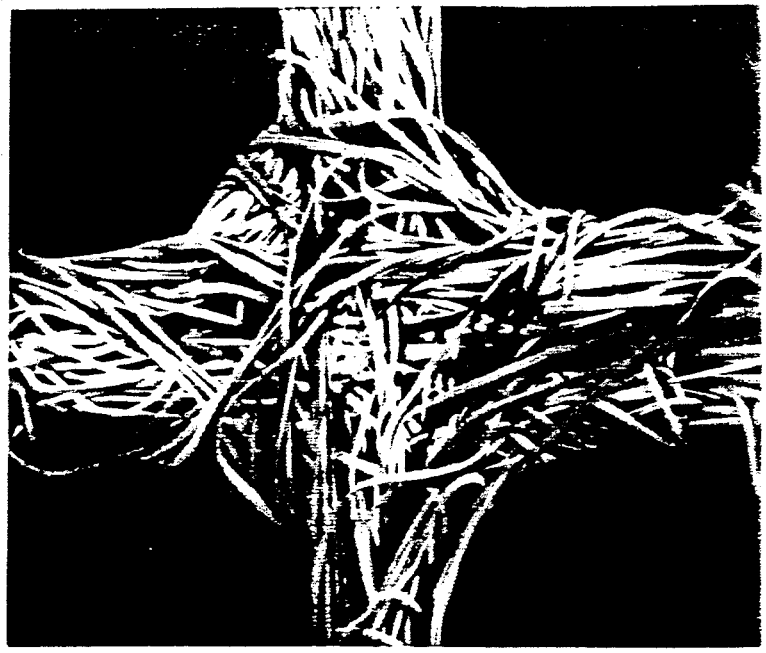
FIG. 22 is a photomicrograph of one interconnected juncture of the fabric in FIG. 20 but further enlarged about 4 times.

FIG. 21 is an enlargement of the fabric of FIG. 20 at a magnification of 76 times and shows one of the fiber groups or "bow-tie" area of the fabric. As may be seen, in approximately the center of this fiber group, there are fiber segments which are wrapped around at least a portion of the periphery of the parallel and tightly compacted fiber segments that make up this yarn-like fiber group; i.e. a "bow-tie". FIG. 22 is an enlargement of one of the junctures of the fabric depicted in FIG. 20. The juncture includes a plurality of fiber segments some of which appear to extend substantially straight through the juncture while other segments appear to make almost a 90° bends within the structure, while still other segments follow a diagonal path as they pass through the juncture.

Figure 23:
FIG. 23 is a photomicrograph of a cross-section of a "bow tie" of the fabric in FIG. 20 but further enlarged about 4 times.

FIG. 23 is a cross sectional view of a "bow tie", area of FIGS. 20 and 21. Substantially parallel fiber segments enter and in some instances pass through the "bow-tie" area. Also, there are fiber segments in the "bow-tie" area that are circumferentially wrapped about the yarn-like fiber group.

Following are two specific examples of a method for producing fabrics in accordance with the present invention.

EXAMPLE 1

Figure 24:
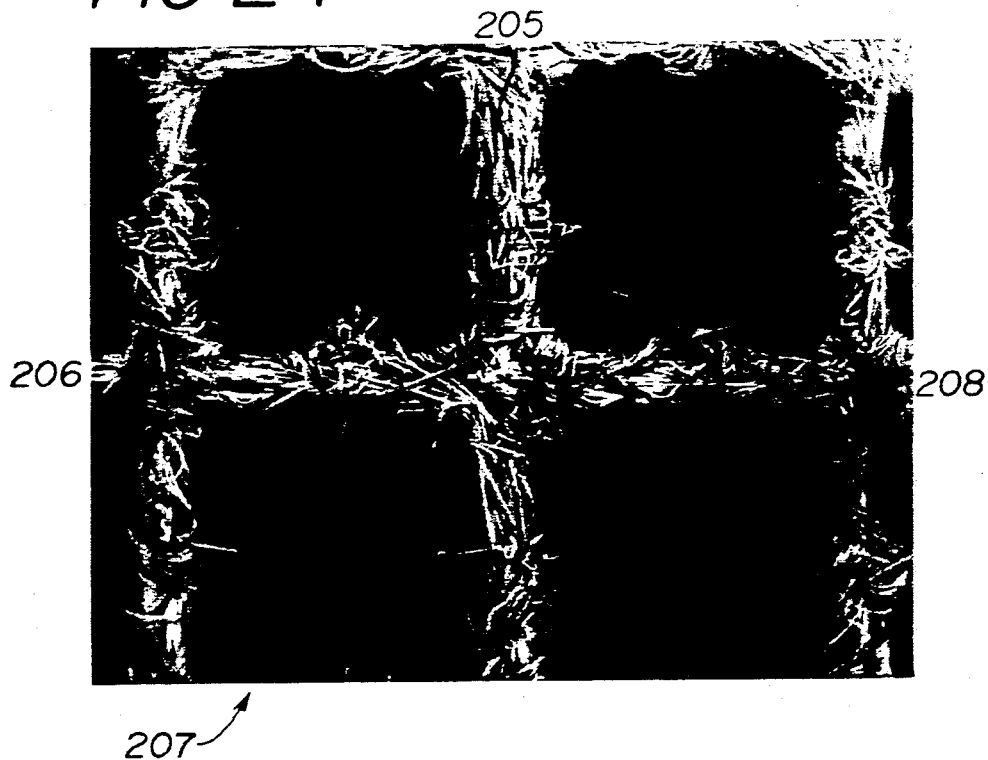
FIG. 24 is a photomicrograph of a fabric of the present invention but enlarged about 25 times.
Figure 25:
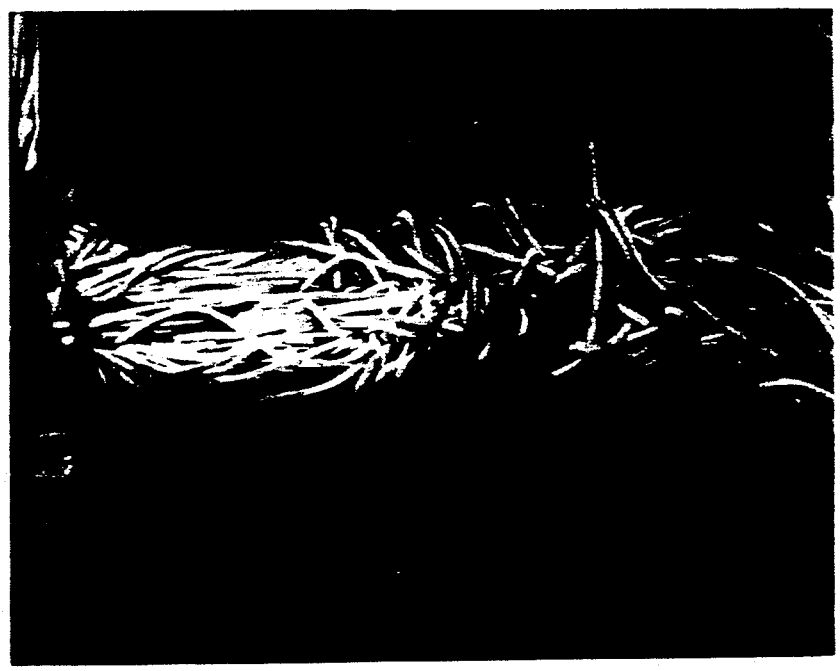
FIG. 25 is a photomicrograph of one of the "bow ties" of the fabric of FIG. 24 but further enlarged about 3 times.
Figure 26:
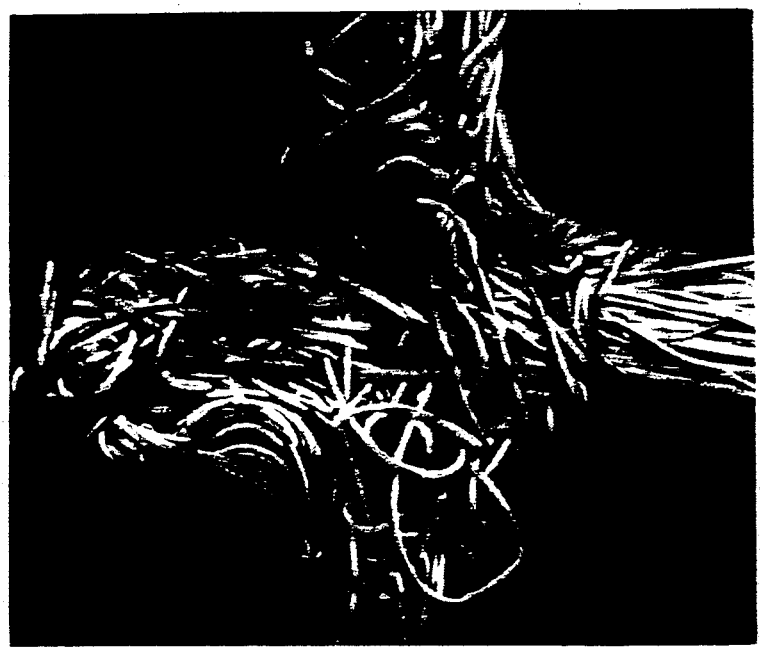
FIG. 26 is a photomicrograph of an interconnected juncture of the fabric of FIG. 24 but further enlarged about 3 times.

Apparatus as depicted in FIG. 2 is used to produce the fabric. A 300 grain wt. isocard fiber web of 1.5 denier, 1.25 inch staple length rayon fibers is produced by the method described in U.S. Pat. No. 4,475,271. The web is placed on top of a forming plate which is supported on a wire, carrier belt. The carrier belt is a 12×10 plain wire polyester monofilament belt supplied by Appleton Wire Works of Appleton, WI. The belt has warps and shutes 0.028 inch (0.2 cm) in diameter and an open area of 44%. The forming plate has a profile as shown in FIG. 12. The valley side (105) of a pyramid is at an angle of 74 degrees to the horizontal and the peak side (107) is at an angle of 56 degrees to the horizontal. The vertically measured distance of side (105) is 0.045 inch (0.114 cm) and the vertical height from valley floor (106) to pyramid apex (108) is 0.090 inch (0.229 cm). The valley floor has a 0.003 inch (0.0076 cm) radius. The pyramids are disposed in a 12×12 square pattern as shown in FIG. 13. The pyramids are spaced on 0.083 inch (0.21 cm) centers. The holes at the sides of the pyramids have a diameter of 0.032 inch (0.08 cm) and the holes at the corners of the pyramids have a diameter of 0.025 inch (0.064 cm). The manifold contains 30 orifices per inch (11.8 per cm) with each orifice being 0.007 inch (0.018 cm) in diameter. The fiber web on the plate is passed under the manifold and wetted with water to position the web on the forming member. Subsequent passes are made at 100 psig, 600 psig and finally three passes at 1000 psig. All passes are made at 10 yards per minute (9.1 meters per minute) and with a vacuum of 24 inches (61 cm) of water. Photomicrographs of the resulting fabric are depicted in FIGS. 24, 25, and 26. FIG. 24 is a planar photomicrograph at a magnification of 25 times of the fabric produced. The fabric comprises a multiplicity of yarn-like fiber groups or bundles 205. The bundles are interconnected at junctures 206 by fibers common to a plurality of the bundles to form a pattern of substantially square openings 207. In the center of each bundle there is an entangled area ("bow-tie") 208 and from that entangled area the bundle extends in opposite directions. As is more clearly seen in the enlargement FIG. 25, which is a magnification of 70 times of one "bow-tie" area of the fabric of FIG. 24, the entangled area comprises a plurality of fiber segments which are looped and intertangled and which extend about a portion of the Periphery of the bundle to maintain the fibers very tightly compacted. FIG. 26, is a magnification of 70 times of one of the interconnected junctures of the fabric of this Example. Some of the fiber segments extend directly through the juncture while other fiber segments extend at a 90° angle through the juncture, and still other fiber portions are looped and tightly entangled within the juncture.

EXAMPLE 2

Figure 27:
FIG. 27 is a photomicrograph of a fabric of the present invention enlarged about 25 times.

A fabric is made with the apparatus as described in conjunction with Example 1. All conditions and parameters are the same with the exception that the starting web weighs 1600 grains per square yard. In the process after one pass at 100 psig and one pass at 600 psig the web is exposed to nine passes at 1000 psig. A planar photomicrograph of the resultant fabric is shown in FIG. 27. As may be seen, though this fabric is more than 5 times the weight of the fabric depicted in FIG. 24, the fabric has extreme clarity and the fiber portions are very dense and compacted. The fabric comprises groups of fiber segments in which the fiber segments are generally parallel and tightly compacted. In the center of each such group is an entangled area with a portion of the fiber segments circumferentially wrapped about a portion of the periphery of the yarn-like fiber group; i.e., a "bow-tie" area. These fiber groups are interconnected at junctures by fibers common to plurality groups to define the pre-determined pattern of substantially square openings. It is surprising to note that the pattern clarity does not decrease to any substantial extent as the fabric weight increases. This of course is contrary to most conventional entangling or nonwoven fabric processes where as fabric weight increases, the pattern clarity of the fabric deteriorates quite rapidly.

Figure 28:
FIG. 28 is a photomicrograph of a "bow tie" area of a fabric of the present invention enlarged about 50 times.

FIG. 28, is a photomicrograph at a magnification of 50 times of another embodiment of a "bow-tie" area of a fabric according to the present invention. In this embodiment the topographical support member used to produce the fabric is as described in conjunction with FIG. 16. There are two entangled areas in the yarn-like fiber group, with each of the entangled areas comprising a plurality of fiber segments which are circumferentially wrapped around a portion of the periphery of the parallel and tightly compacted fiber segments within the yarn-like fiber group.

Figure 29:
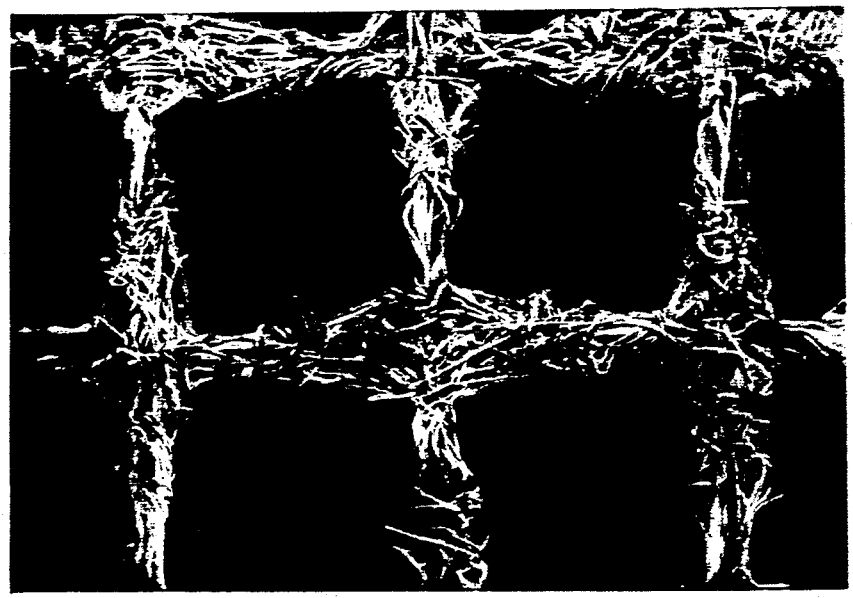
FIG. 29 is a photomicrograph of a fabric of the present invention enlarged about 20 times.
Figure 30:
FIG. 30 is a photomicrograph of a "bow tie" area of the fabric of FIG. 29 but further enlarged about 2.5 times.

In FIGS. 29 and 30, there is shown yet another embodiment of a fabric according to the present invention. FIG. 29 is a planar view at a magnification of 20 times of a fabric made from a 600 grain wt. fibrous web wherein the fibers are 1.5 denier, 1.25 inch staple length rayon. The fiber web has been processed in accordance with the present invention using a topographical support member similar to that depicted in FIGS. 10 and 11, except that the holes are relatively long, narrow slots rather than being circular. The slots are uniform in width and rounded at the ends. The slots are long enough to extend along the valley floor from the center of the sides between two pyramids across an intersection to the center of the sides of adjacent pyramids. In FIG. 29, the fabric comprises a multiplicity of yarn-like fiber groups wherein the fiber segments are relatively parallel and compacted. The groups are interconnected at junctures by fibers which are common to a Plurality of the groups to form a pre-determined pattern of canted square openings. As more clearly shown in the photomicrograph in FIG. 30 which is a magnification of 50 times of one of the yarn-like fiber groups, the yarn-like fiber group is tapered as it passes from one interconnected juncture to an adjacent interconnected juncture. Generally, in the mid point of this yarn-like fiber group there is a highly entangled area which includes some fiber segments which are circumferentially wrapped about a portion of the periphery of the yarn-like fiber group. As may be seen in this photomicrograph, in the narrowed area of the tapered yarn-like fiber group, most of the fiber segments are substantially parallel to one or more adjacent fiber segments, whereas in the wider tapered portion the outer periphery of this tapered portion includes parallelized fiber segments while the inner portion of this periphery is an entangled area. The narrowed (highly densified) areas of the Yarn-like fiber groups comprise a fine capillary structure and a rapid absorbency rate in the fabric. The wider (less densified) portion provides a structure of larger capillaries for high absorbent capacity. In this manner the absorbent properties of the fabric may be engineered as desired.

Figure 31:
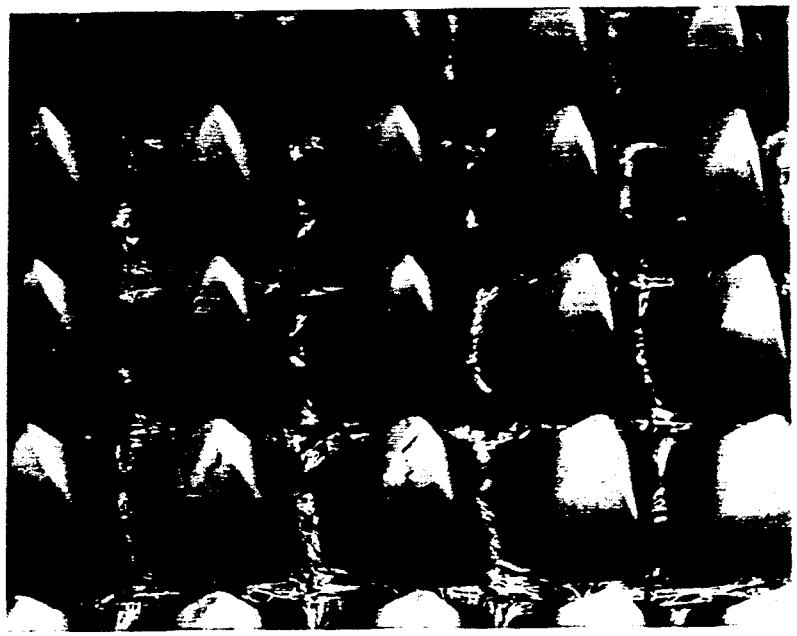
FIG. 31 is a photomicrograph of another embodiment of a fabric of the present invention at an enlargement of 15 times wherein fiber segments include a twist.
Figure 32:
FIG. 32 is a photomicrograph of the fabric of FIG. 31 but further enlarged about two times.

As can be appreciated, one of the things that provides excellent strength in woven or knitted fabrics is that the yarn produced from the fibers is given a twist. This, of course, compacts the fibers in the yarn to some degree and places them in closer contact to increase the frictional engagement between fibers. When that yarn is tensed or pulled, this frictional engagement increases the strength of the yarn. In certain embodiments of the fabrics of the present invention, we can accomplish a twist in the yarn-like fiber groups which extend between the junctures. In FIG. 31 and 32 there is shown a fabric of the present invention wherein the fiber segments between interconnected junctures have a twist. FIG. 32 is an enlarged portion of the fabric of FIG. 31. In both FIGS. the fabric has been photographed while still on the forming plate.

The following is a specific example of a method for producing a fabric of the present invention wherein fiber segments are twisted between interconnected junctures.

EXAMPLE 3

Figure 33:
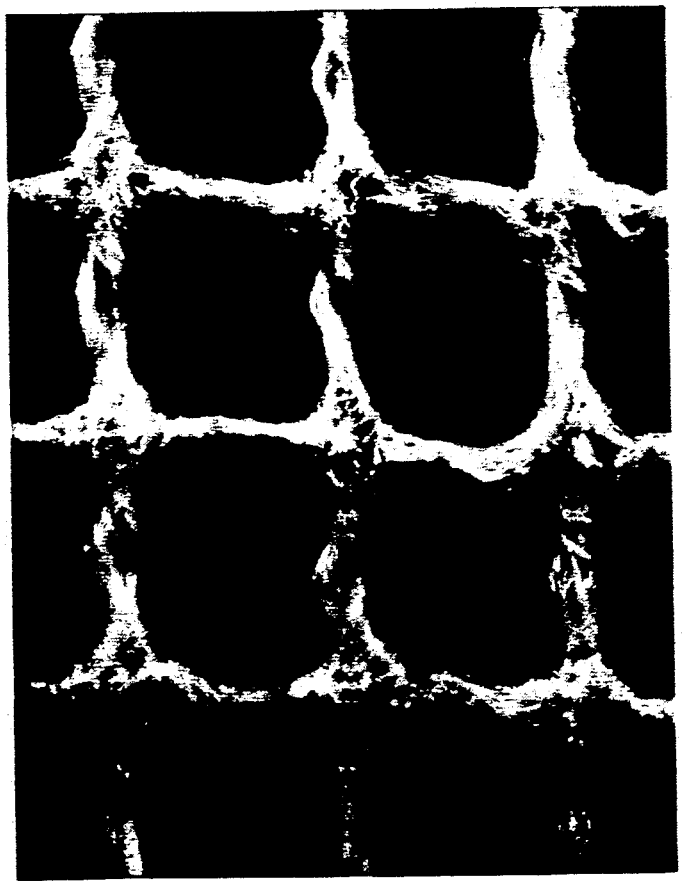
FIG. 33 is a photomicrograph of another embodiment of the fabric of the invention enlarged about 15 times.

The process parameters, conditions and equipment used in this Example are the same as in the previous examples except the starting web in 300 grains per square yard of bleached cotton fiber which has a micronaire of 4.8, a staple length of 30/32 inch and a strength of 22 grams per tex. The forming member has a pattern of 12×12 pyramids in a square configuration. Each pyramid has a vertical height of 0.155 inch (0.39 cm) as measured from the valley floor to the pyramid apex. The sides of the pyramid are at an angle of 75 degrees to the horizontal. The valley floor has a width of 0.006 inch (0.015 cm). The holes are at the corners of the pyramids and are 0.038 inch (1 cm) in diameter. The process comprises one pass at 20 psig with no vacuum followed in sequence by one pass at 100 psig, one pass at 600 psig and three passes at 1000 psig all with 25 inches (63.5 cm) of water vacuum. FIG. 33 is a planar photomicrograph at a magnification of 15 times of the resultant fabric showing yarn-like twist between intersections.

Figure 34:
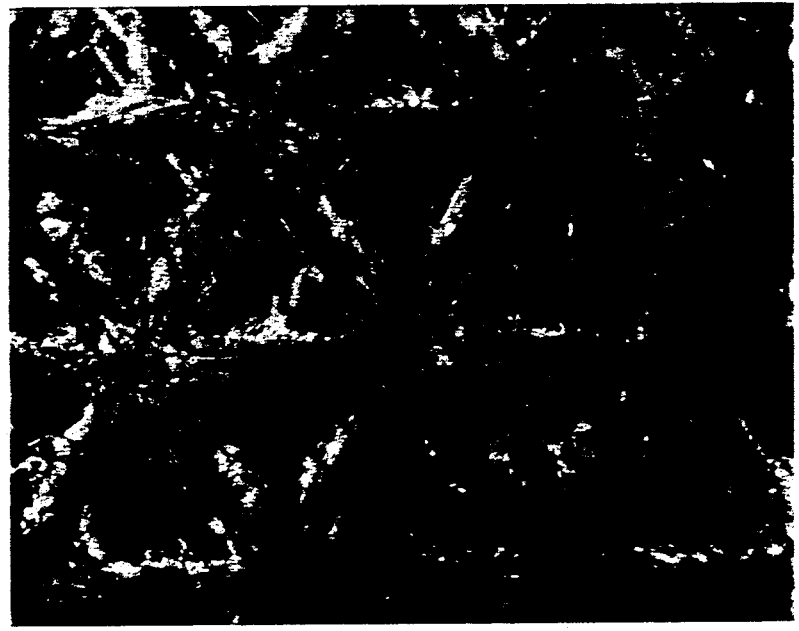
FIG. 34 is a photomicrograph of still another embodiment of the fabric of the invention enlarged about 35 times.

While all of the previous fabrics have been made with topographical plates in which square pyramids are used, in FIG. 34 there is a photomicrograph, at 15 times magnification, of a fabric made using a topographical Plate wherein the pyramids are triangular instead of square. In this instance, the fabric has three axes instead of the usual two. This gives the product very different and unusual tensile properties which are three directional. This configuration reduces the biasability resilience of the fabric. As seen in FIG. 34 each juncture has six yarn-like fiber groups emanating from the juncture. Each Yarn-like fiber group has an area of entanglement where at least some fiber segments are wrapped about a portion of the periphery of the yarn-like fiber group.

Figure 35:
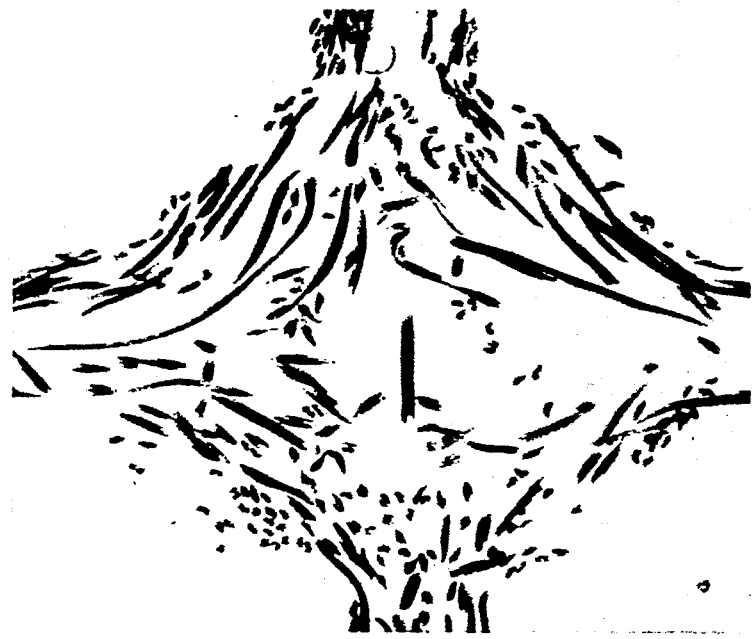
FIG. 35 is a planar cross-section photomicrograph of an interconnected juncture of a fabric according to the present invention enlarged about 88 times.
Figure 36:
FIG. 36 is a planar cross-section photomicrograph of an interconnected juncture of a prior art fabric enlarged about 88 times.

It is interesting to note that in the junctures of the fabrics of the present invention, the fibers are extremely compact and uniformly dense. Some fiber segments pass directly through the juncture while other fiber segments make right angle turns as they pass through the juncture while still other fiber segments pass through the "Z" plane of the juncture to tighten the juncture and form a very highly entangled area. FIGS. 35 and 36 are cross-sectional photomicrographs at a magnification of 88 times. FIG. 35 is a photomicrograph of a juncture of a fabric of the present invention. This fabric is made from a 400 grain per square yard isocard web of rayon fibers which are 1.5 denier and 1.5 inch (3.8 cm) staple length. The forming plate contains pyramids in a 12×12 square pattern on a 0.083 inch (0.21 cm) centers with the sides at an angle of 75 degrees to the horizontal. The holes at the midpoint of the sides of the pyramids are 0.032 inch (0.08 cm) in diameter. The holes at the corners of the pyramids are 0.025 inch (0.06 cm) in diameter. The orifices, supporting belt, etc. are the same as described in conjunction with the previous examples. The process consists of one pass at 100 psig, one pass at 600 psig and three passes at 1000 psig, all using a vacuum of 25 inches (63.5 cm) of water. The photomicrograph shows the parallelized fiber segments extending through the juncture and the fiber segments which pass at 90° through the juncture. It also shows a great number of fiber segments passing through the Z plane of the juncture, all of which form the highly entangled juncture. As contrasted to this, FIG. 36 shows a juncture of a fabric made in accordance with the prior art. This fabric is made as described in U.S. Pat. No. 3,485,706. The forming member is a 12×12 square weave polyester filament belt. The web is an isocard web of 1.5 denier, 1.5 inch (3.8 cm) staple length rayon fibers. The web weighs 400 grains per square yard. The first manifold is operated at 100 psig, the second manifold at 600 psig and the third, fourth and fifth manifolds at 1000 psig. Vacuum of 25 inches (63.5 cm) of water is used under each manifold. As may be seen, there is some entanglement in the juncture and some parallelized fiber segments. However, the juncture is not nearly as compacted and densified and there is considerably more randomness in the fiber array of this juncture than in the junctures of the fabrics of the present invention.

As is seen from the photomicrographs, FIGS. 20 through 34, the fabrics of the present invention have unique structural characteristics. These characteristics are that the fibrous areas of the fabrics are very dense and compact, to a much greater degree than in prior art nonwoven fabrics. The denseness or compactness is uniform in the fiber groups and resembles that which occurs in spun yarns of similar fibers of similar denier. Another unique characteristic that appears in all the fabrics of the present invention is the degree of clarity of the open areas of the fabrics. There are few fiber ends, loops or segments which extend into the open areas to reduce the clarity of the fabric. This property makes the resultant fabrics appear similar to woven fabrics. Also the interconnected areas of the fabric are not enlarged as in prior art fabrics. This further contributes to the woven appearance of the fabrics of the present invention. These structural characteristics allow one to develop greatly improved physical properties in the final fabrics. The fabrics of the present invention have good strength. Also, the fabrics of the invention may have controlled and good absorbent characteristics, especially wicking characteristics.

The absorbency and/or wicking properties of the fabrics of the present invention may be varied and predetermined by the degree of compaction of the yarns. Fabrics may be made containing both highly compact yarns (for rapid wicking) and less compact yarns (for high liquid absorbent capacity) by using support members with narrow valleys in one direction and wider valleys in the other direction and/or by using various configured openings in the support members such as slots, ovals and the like.

The wicking characteristics of a fabric of the present invention is compared with wicking characteristics of a fabric of the prior art. The fabric of the present invention weighs 5 mgs. per sq. cm. and is made using 1.5 denier, 1 9/16 inch (3.96 cm) rayon fiber. The apparatus as depicted in FIG. 5 is used with a forming member as shown in FIGS. 8 and 9. The angle $\partial$ is 73 degrees and the pyramid height is 0.134 inch (0.34 cm) as measured vertically from the base of the valley to the apex of the pyramid. The pyramids are arranged in a square 12×12 pattern, approximately 0.083 inch (0.2 cm) from center to center of adjacent pyramids. The holes have a diameter of 0.038 inch (0.06 cm). The member with the pyramid projections is placed on a carrier belt which is a 12×10 plain weave, polyester filament belt as supplied by Appleton Wire Works of Appleton, WI. The filaments have a diameter of 0.028 inch (0.2 cm) and the belt has an open area of 44%. The manifold is equipped with an orifice strip containing 30 orifices per inch (11.8 per cm) of 0.007 inch (0.02 cm) in diameter. The water temperature is 110° F. A fibrous web prepared by the textile card described in U.S. Pat. No. 4,475,271 is placed on the forming member and the forming member positioned on the carrier belt. The web, forming member and carrier belt is passed under the manifold operating at 40 psig to wet the fibers and position them on the forming member. Subsequent passes are made under the manifold with the first at 100 psig, the second at 600 psig and the next three at 1000 psig. All passes are made at 10 yards/minute (9 meters/min). No vacuum is used on the first pass, a vacuum of 20 inches (50.8 cm) of water is used on the second pass and a vacuum of 24 inches (61 cm) of water is used on subsequent passes.

The prior art fabric is made in accordance with all the parameters and conditions as described above for the fabric of the present invention except that the pyramidal forming member is not used and the fiberous web is placed directly on the carrier belt. The prior art fabric weighed 5.8 mgs. per sq. cm. Each of the fabrics has a smooth side and a rough side. It is believed the smooth side is that side of the fabric which is impinged by the fluid forces and the rough side is the side opposite the side impinged by the fluid forces.

Figure 37:
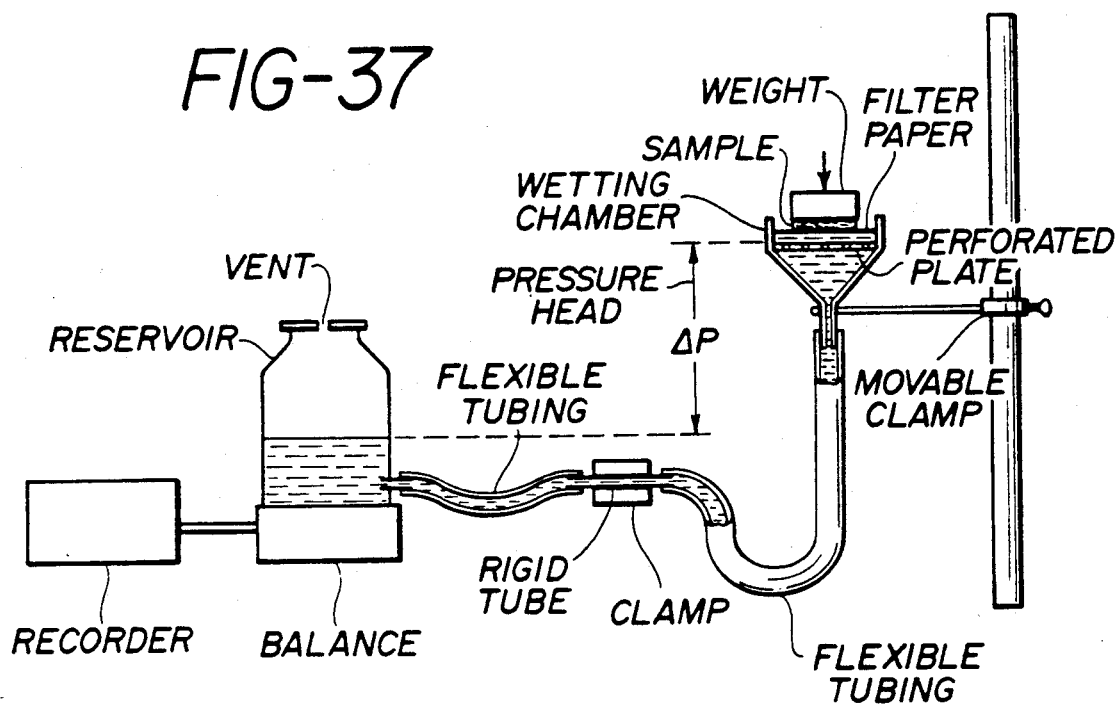
FIG. 37 is a diagram of the instrumentation used to measure the spontaneous uptake of liquids by fabrics.

The wicking characteristics of the two fabrics are compared using methodology developed by the Textile Research Institute of Princeton, N.J. The methodology is entitled "Spontaneous Transplanar Uptake of Liquids by Fibrous Materials" and is published in the Textile Research Institute, *Notes on Research*, Number 360, Jan. 1984. The instrumentation used for carrying out these measurements is depicted in FIG. 37. A pressure gradient ($\Delta P$) is established before the sample is placed on the filter paper. The wetting chamber is lowered until the filter paper is slightly below the liquid level in the chamber so as to completely wet the paper. The chamber is then raised so that the liquid level is above that of the reservoir. The sample to be evaluated is attached to a weighted plastic compression plate (load) using double sided tape. The sample is placed on the wet filter paper. The progress of liquid uptake is followed automatically from the moment of contact, by the loss in weight of the reservoir, indicated by the top-loading recording balance. The balance used provides a real time record of the movement of liquid into the sample. The method may be used to measure initial rate of absorption and time to reach 90% of absorptive capacity at various pressure heads and at various loads of compression of the fabric being tested. The following table provides the results of the above comparison. It should be noted that both the smooth side and the rough side of both fabrics are tested. The results presented in the following tables are the average of three runs in each case.

TABLE I

| Fabric | Surface | Initial Rate mg/cm² sec. | 90% Time-Sec. |
|---|---|---|---|
| $\Delta P = 14$ cm H$_2$O, Load 3.5 g/cm² | | | |
| Prior Art | Smooth | Both too fast | 9.6 |
| Present Invention | Smooth | to measure | 7.0 |
| Prior Art | Rough | 0.46 | 53 |

TABLE I-continued

| Fabric | Surface | Initial Rate mg/cm² sec. | 90% Time-Sec. |
|---|---|---|---|
| Present Invention | Rough | 0.71 | 34 |
| $\Delta P = 35$ cm H$_2$O, Load 3.5 g/cm² | | | |
| Prior Art | Smooth | 0.51 | 34 |
| Present Invention | Smooth | 0.47 | 31 |
| Prior Art | Rough | 0.16 | 50 |
| Present Invention | Rough | 0.08 | 193 |
| $\Delta P = 35$ cm H$_2$O, Load 17.5 g/cm² | | | |
| Prior Art | Smooth | 0.86 | 23 |
| Present Invention | Smooth | 1.19 | 11 |
| Prior Art | Rough | 0.54 | 34 |
| Present Invention | Rough | 0.52 | 25 |

As may be seen under compressive loading the fabrics of the invention wick considerably faster, i.e. they absorb liquids faster and also reach their absorptive capacity faster than do prior art fabrics.

The clarity of fabrics may be measured by image analysis. Essentially image analysis converts an optical image from a light microscope into an electronic signal suitable for processing. An electron beam scans the image, line by line. As each line is scanned an output signal changes according to the illumination. White areas produce a high voltage and black areas a low voltage. An image of a fabric is produced and the open areas of the fabric are white in the image and the fiber areas are at various levels of grey in the image. The denser the fiber area the darker the grey area produced. Each line of the image that is measured is divided into sampling points or pixels. Such an analysis is carried out using a QUANTIMET Q520 Image Analyzer sold by Cambridge Instruments Ltd. The analyzer uses Version 4.0 Software with a Grey Store Option. The light microscope used is an Olympus SZH Microscope with a transmitted light base and a plan 2X objective. The image is produced with a DAGE MTI-65 video camera. Image analysis of various apertured fabrics including non-woven fabrics of the prior art, woven guaze and fabric of the present invention are performed.

A representative piece of each fabric to be analyzed is placed on the microscope stage and sharply imaged on the video screen. A magnification is chosen to image at least one complete aperture or one fiber bundle of each fabric to be analyzed (this requires a setting which calibrates to 0.01 mm/pixel on the Q520 System). The microscope illuminator is set to yield a grey level output of 255 for a blank (white) field and 0 for a totally dark (black) field. After adjustment, the shading corrector is set to assure even illumination across the field of view. Grey images are collected for representative areas of each fabric in order that Grey Level Intensity Line Profiles may be generated.

Line profiles are obtained for fabrics of the invention with the line set to cross an aperture and the adjacent fiber bundle in the region between the "bowtie" structure and an interconnected juncture. For fabrics of the prior art and for woven gauze the line profile is generated along a line through an aperture and an adjacent typical fiber bundle. These line profiles are then printed as histograms of grey level intensities plotted as a function of pixel location along the line of measurement.

Figure 38:
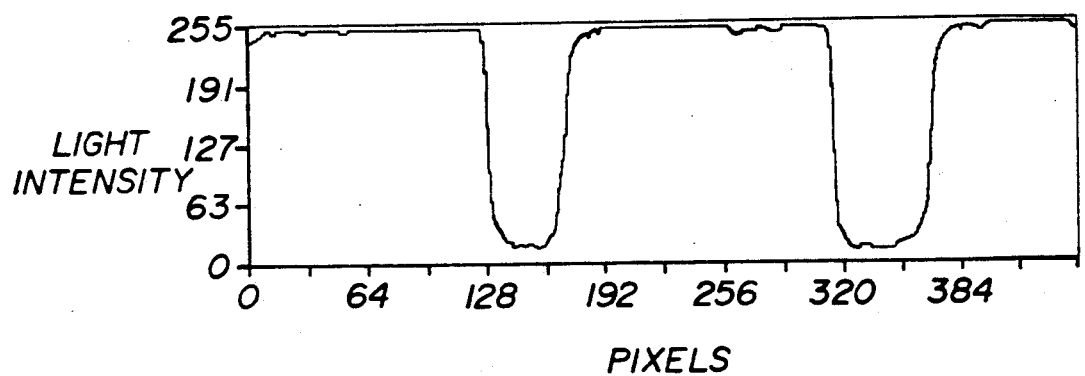
FIG. 38 is a histogram of grey level intensity of a fabric of the present invention.

Referring to FIGS. 38, 39, and 40 these are shown grey level intensity histograms of various fabrics. FIG. 38 is such a histogram of the fabric of the present invention shown in FIG. 20. FIG. 39 is such a histogram of a standard woven gauze. FIG. 40 is a histogram of a prior art apertured non woven fabric produced as described above in the discussion of the wicking characteristics of fabrics. As may be seen in the histogram of the fabric of the present invention, (FIG. 38) the transition from open area to fiber bundle area is very abrupt showing the fabric has excellent clarity. A similar abrupt transition is seen in the woven gauze histogram (FIG. 38) the transition from open area to fiber bundle area is very abrupt showing the fabric has excellent clarity. A similar abrupt transition is seen in the woven gauze histogram (FIG. 39). However the histogram does show a few peaks in the open area which indicate loose fiber ends which extend from a yarn into the aperture. The transition from open area to fiber area in the histogram of the prior art (FIG. 40) is not abrupt and indicates considerable lack of clarity in the fabric.

The grey level histograms are analyzed using the Q520 Image Analysis System to determine the clarity of the fabric. This is done by measuring the amount of light absorbed by fibers in both an open area and a fiber area of the fabric. The degree of clarity of the fabric is measured or determined as related to the maximum clarity that theoretically might be obtained. This may be done by measuring the area above the curve in the portion of the histogram defining the fabric aperture or opening and dividing it by the total area of the portion of the histogram defining the fabric aperture or opening. The lower this figure, i.e., the smaller the area above that portion of the curve of the histogram the clearer or the greater the clarity of the opening. Theoretical maximum clarity of an open areas is measured by this technique would be "0" as no light is absorbed. If similar measurements are made in the fiber containing area and the area above the curve in the portion of the histogram defining the fiber area is divided by the total area of that portion the theoretical maximum density of a fiber area is one; i.e. the area above the curve is equal to the total area as all light is absorbed. The overall clarity of the fabric may be determined by dividing the density of fiber areas by the clarity of the openings. The higher the resultant number, the greater the overall clarity of the fabric.

The following table gives the clarity of the openings, the fiber areas and the overall clarity of the fabric for the three fabrics represented by the histograms shown in FIGS. 38, 39, and 40.

TABLE II

|  | Clarity of Openings | Density of Fiber Areas | Fabric Clarity (Density of Fiber Areas/ Clarity of Openings) |
|---|---|---|---|
| FIG. 38 (Fabric of Invention) | .034 | .737 | 21.7 |
| FIG. 39 (Woven Gauze) | .060 | .729 | 12.2 |
| FIG. 40 (Prior Art Nonwoven Fabric) | .043 | .549 | 12.8 |

As may be seen from the above table, the clarity of the openings in the fabrics of the present invention is substantially improved over the clarity of openings in either woven gauze or prior art non woven fabrics. Also unexpectedly, the density of the fiber areas in the fabrics of the present invention is similar to the density of yarn in woven guaze. Furthermore, the overall clarity of the fabrics of the present invention is unexpectedly greatly improved.

Having now described the invention in specific detail and exemplified the manner in which it may be carried into practice, it will be readily apparent to those skilled in the art that innumerable variations, applications, modifications and extensions of the basic principles involved may be made without departing from its spirit or scope.

What is claimed is:

1. A non-woven fabric comprising a multiplicity of yarn-like fiber groups, said groups being interconnected at junctures by fibers common to a plurality of said groups to define a predetermined pattern of holes in the fabric, said yarn-like fiber groups comprising a plurality of parallel and tightly compacted fiber segments, a least some of said yarn-like fiber groups include fiber segments circumferentially wrapped around at least a portion of the periphery of said parallel and tightly compacted fiber segments.

2. The non-woven fabric of claim 1 wherein the circumferentially wrapped portion includes fiber segments which extend into and at least partially through the yarn-like fiber groups.

3. The non-woven fabric of claim 1 wherein the circumferentially wrapped portion is disposed substantially in the center of the fiber group between interconnected junctures.

4. The non-woven fabric of claim 1 wherein the plurality of parallel and compacted fiber segments in some of the fiber groups have a helical path.

5. The non-woven fabric of claim 1 wherein there are a plurality of circumferentially wrapped portions disposed between interconnected junctures.

6. The non-woven fabric of claim 1 wherein the junctures comprise a plurality of fiber segments, some of said fiber segments being straight, while others of said fiber segments have a 90° bend while still other fiber segments have a diagonal path within the juncture.

7. The non-woven fabric of claim 6 wherein said junctures include fiber segments extending in the 'Z' direction of the fabric.

8. A non-woven fabric comprising a plurality of re-arranged fibers to form yarn-like fiber groups wherein fiber segments within a group are compacted and substantially parallelized, and a plurality of highly entangled areas, some of said entangled areas interconnecting said yarn-like fiber groups while others of said entangled areas being disposed in a yarn-like fiber group.

9. The non-woven fabric of claim 8 wherein the entangled area disposed in a yarn-like fiber group is substantially centered between adjacent entangled areas that interconnect the yarn-like fiber groups.

10. A non-woven fabric comprising a multiplicity of yarn-like fiber groups interconnected at junctures by fibers common to a plurality of said groups to define a pre-determined pattern of holes, said yarn-like fiber groups comprising a plurality of parallel and tightly compacted fiber segments, the fiber segments in at least some of said yarn-like groups being twisted whereby the fiber segments follow a helical path as they pass along said yarn-like fiber group.

11. A non-woven fabric having a ratio of fiber area density to aperture clarity of at least 20 as determined by Grey Histogram Image Analysis. by Grey Histogram Image Analysis.

12. A non-woven fabric of claim 11 wherein the fiber areas absorb at least 70% of the light in a Grey Histogram Image Analysis.

13. A non-woven fabric of claim 11 wherein the apertures absorb less than 4% of the light in a Grey Histogram Image Analysis.

14. A machine to produce a non-woven fabric having a predetermined pattern of holes defined by yarn-like fiber groups interconnected at junctures from a layer of starting fibrous material, the individual fibrous elements of which are capable of movement under the influence of applied fluid forces, which comprises a three dimensional backing member having a specific topographical configuration for supporting a fibrous web thereon, said backing member having a plurality of pyramids disposed in a pattern over one surface thereof, each pyramid having an apex and a base, and a plurality of sides extending from the apex to the base, the sides of the pyramids being at an angle greater than 55% to the horizontal surface of the backing member, said backing member including a plurality of openings therein, said opening being disposed in a predetermined pattern with respect to said pyramids and means for projecting adjacent fluid streams simultaneously against the top of said pyramids while a fibrous layer is disposed thereon.

15. A machine according to claim 14 wherein the openings are disposed in the areas where the sides of the pyramids meet said backing member.

16. A machine according to claim 15 wherein the openings extend up the sides of the pyramids.

17. A machine according to claim 14 wherein each pyramid has four sides.

18. A machine according to claim 17 wherein the apices of the pyramids are aligned longitudinally and transversely of the backing member.

19. A machine according to claim 14 which includes openings at the sides of the pyramids and openings at the corners of the pyramids.

20. A machine according to claim 14 wherein the openings are oval-shaped.

21. A machine according to claim 11 wherein the openings are oval-shaped and extend along a portion of the sides of adjacent pyramids and through the corner where four pyramids meet.

22. A machine according to claim 14 wherein the sides of the pyramids extend at an angle of at least 70° to the horizontal surface of the backing member for a portion of the side of the pyramid and thereafter make an angle of less than 70° with said horizontal surface from said portion to the apex of the pyramid.

23. A machine according to claim 14 wherein the sides of the pyramids are at an angle of greater than 65° to the horizontal surface of the backing member.

24. A machine according to claim 14 wherein the openings are circular and have a diameter substantially equal to the distance between the base of adjacent pyramids.

25. A machine for producing a rearranged non-woven fabric from a layer of starting fibrous material, the individual fibrous elements of which are capable of movement under the influence of applied fluid forces which comprises; a rotatable hollow drum having a plurality of pyramids extending from the outer surface of said drum, said pyramids being disposed axially and circumferentially of the drum, each pyramid having an apex and a base and a plurality of sides extending from the apex to the base, the sides of the pyramids being at an angle of greater than 55° to the surface of the drum, said drum surface having a plurality of openings disposed in a predetermined Pattern, means for positioning said fibrous layer on the apices of the pyramids over a portion of the periphery of the drum, means located outside the drum for projecting adjacent fluid streams simultaneously against said fibrous layer and then against the Pyramids and then through the openings and into the drum, means for rotating said drum while said fluid is being projected against said outside surface, means disposed inside the drum to remove the fluid from the surface of the drum and means for removing said rearranged fabric from the surface of the drum.

26. The method of producing a non-woven fabric containing spaced openings defined by groups of fiber segments from a layer of a randomly arranged overlapping fibers in frictional engagement with one another, said fibers being capable of movement in response to applied fluid forces which comprises; supporting the layer locally throughout the area to be affected to maintain its integrity, while the layer is so supported, moving segments of fibers in said layer, sidewise from areas of the layer spaced laterally and longitudinally from each other, into closer proximity to and increased parallelism with segments of adjacent fibers lying between said spaced areas, simultaneously moving segments of fibers in a circumferential path about the segments of fibers which are moved into closer proximity and increased parallelism by applying to the approximate centers of each immediately adjacent pair of spaced areas forces having opposed lateral translatory components of force acting parallel to the plane of the layer and cooperating rotational components of force, a portion of said rotational components of force acting in the plane of the fibrous layer and parallel to said plane, while other rotational forces act in the plane of the fibrous layer and perpendicular to said plane.

* * * * *